(12) United States Patent
Hayata et al.

(10) Patent No.: US 11,650,470 B2
(45) Date of Patent: May 16, 2023

(54) DECORATIVE FILM, MOLDED PRODUCT, AND ELECTRONIC DEVICE

(71) Applicant: FUJIFILM CORPORATION, Tokyo (JP)

(72) Inventors: Yuichi Hayata, Kanagawa (JP); Jun Watanabe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/660,636

(22) Filed: Apr. 26, 2022

(65) Prior Publication Data

US 2022/0260870 A1    Aug. 18, 2022

Related U.S. Application Data

(63) Continuation of application No. PCT/JP2020/042524, filed on Nov. 13, 2020.

(30) Foreign Application Priority Data

Nov. 13, 2019    (JP) .............................. JP2019-205281

(51) Int. Cl.
*G02F 1/137*    (2006.01)
*G02F 1/1335*    (2006.01)
*G06F 1/16*    (2006.01)

(52) U.S. Cl.
CPC ...... *G02F 1/13718* (2013.01); *G02F 1/13787* (2021.01); *G02F 1/133553* (2013.01); *G06F 1/1656* (2013.01)

(58) Field of Classification Search
CPC ........... G02F 1/13718; G02F 1/133553; G02F 1/13787; G02B 5/0263; B44F 1/02
See application file for complete search history.

(56) References Cited

U.S. PATENT DOCUMENTS

| 8,134,660 | B2 | 3/2012 | Umeya et al. | |
| 2001/0040542 | A1* | 11/2001 | Harada | ................ G09G 3/3629 345/87 |

(Continued)

FOREIGN PATENT DOCUMENTS

| JP | 2001-105795 A | 4/2001 |
| JP | 2003-532565 A | 11/2003 |

(Continued)

OTHER PUBLICATIONS

International Search Report issued in International Application No. PCT/JP2020/042524 dated Jan. 19, 2021.

(Continued)

*Primary Examiner* — Donald L Raleigh
(74) *Attorney, Agent, or Firm* — Solaris Intellectual Property Group, PLLC

(57) ABSTRACT

Provided are a decorative film including a reflective layer which consists of a dielectric multi-layer film and develops a color due to an optical interference or a structural color, in which the dielectric multi-layer film has a plurality of regions having different reflection performances in an in-plane direction, at least one of the plurality of regions is a region having a specular reflectivity, and at least another one of the plurality of regions is a region having a diffuse reflectivity; and a molded product and an electronic device using the decorative film.

8 Claims, 4 Drawing Sheets

(56) References Cited

U.S. PATENT DOCUMENTS

| | | | |
|---|---|---|---|
| 2001/0046015 A1 | 11/2001 | Van De Witte et al. | |
| 2004/0131588 A1 | 7/2004 | Ferro et al. | |
| 2004/0160557 A1 | 8/2004 | Van De Witte et al. | |
| 2007/0109471 A1* | 5/2007 | Ting | G02F 1/13718 349/113 |
| 2007/0291339 A1 | 12/2007 | Kumasawa | |
| 2009/0059158 A1* | 3/2009 | Umeya | G02B 5/0263 349/193 |
| 2010/0254938 A1 | 10/2010 | Ferro et al. | |
| 2014/0363394 A1 | 12/2014 | Ferro et al. | |
| 2020/0183214 A1 | 6/2020 | Katoh | |
| 2020/0225387 A1 | 7/2020 | Ishiguro et al. | |

FOREIGN PATENT DOCUMENTS

| | | |
|---|---|---|
| JP | 2007-268896 A | 10/2007 |
| WO | 2007/105721 A1 | 9/2007 |
| WO | 2019/035449 A1 | 2/2019 |
| WO | 2019/073974 A1 | 4/2019 |

OTHER PUBLICATIONS

Written Opinion of the ISA issued in International Application No. PCT/JP2020/042524 dated Jan. 19, 2021.
English language translation of the following: Office action dated Nov. 8, 2022 from the JPO in a Japanese patent application No. 2021-556197 corresponding to the instant patent application.

* cited by examiner

DECORATIVE FILM, MOLDED PRODUCT, AND ELECTRONIC DEVICE

CROSS-REFERENCE TO RELATED APPLICATIONS

This application is a continuation application of International Application No. PCT/JP2020/042524, filed Nov. 13, 2020, the disclosure of which is incorporated herein by reference in its entirety. Further, this application claims priority from Japanese Patent Application No. 2019-205281, filed Nov. 13, 2019, the disclosure of which is incorporated herein by reference in its entirety.

BACKGROUND OF THE INVENTION

1. Field of the Invention

The present disclosure relates to a decorative film, a molded product, and an electronic device.

2. Description of the Related Art

A decorative molded article, in which a decorative film is disposed on a surface of a resin molded article to color the surface in a desired color tone or to provide a desired pattern on the surface of the resin molded article, has been known. The decorative molded article is obtained, for example, by previously disposing a decorative film in a mold and injection-molding a base material resin into the mold, thereby having a structure in which the surface of the resin molded article is integrated with the decorative film. The injection mold of the base material resin after previously disposing the decorative film in the mold is generally referred to as film insert molding or simply insert molding. In addition, the decorative molded article may be manufactured by attaching a decorative film to a molded article after molding.

As a hot stamp foil in the related art, JP2001-105795A discloses a hot stamp foil characterized in that a cholesteric liquid crystalline polymer layer having a selective reflection wavelength range in visible light is laminated as a transfer layer.

SUMMARY OF THE INVENTION

An object to be achieved by one embodiment of the present disclosure is to provide a decorative film which has different reflection patterns in a plane and has excellent designability.

An object to be achieved by another embodiment of the present disclosure is to provide a molded product obtained by molding the decorative film.

An object to be achieved by still another embodiment of the present disclosure is to provide an electronic device using the decorative film.

The present disclosure includes the following aspects.

<1> A decorative film comprising:
a reflective layer which consists of a dielectric multi-layer film and develops a color due to an optical interference or a structural color,
in which the dielectric multi-layer film has a plurality of regions having different reflection performances in an in-plane direction,
at least one of the plurality of regions is a region having a specular reflectivity, and
at least another one of the plurality of regions is a region having a diffuse reflectivity.

<2> The decorative film according to <1>,
in which, in the region having a specular reflectivity, a ratio (Rm/Ri) of a 5° specular reflectance (Rm) to an integral reflectance (Ri) at a reflected light peak wavelength is 50% or more, and
in the region having a diffuse reflectivity, a ratio (Rm/Ri) of a 5° specular reflectance to an integral reflectance at a reflected light peak wavelength is 1% or more and less than 50%.

<3> The decorative film according to <1> or <2>, in which the reflective layer is a cholesteric liquid crystal layer obtained by immobilizing a liquid crystal compound in a cholesteric alignment state.

<4> The decorative film according to <3>, in which the cholesteric liquid crystal layer in the region having a specular reflectivity forms a cholesteric alignment state in which the liquid crystal compound has a helical axis in a vertical direction of a surface of the decorative film.

<5> The decorative film according to <3> or <4>, in which, in the cholesteric liquid crystal layer in the region having a diffuse reflectivity, helical axes in a cholesteric alignment state are different from each other in a plane, and a cholesteric liquid crystal structure has a flapping structure in a cross-sectional view in a thickness direction.

<6> The decorative film according to <4> or <5>, in which the cholesteric liquid crystal layer includes a plurality of regions having different pitches of helical structures.

<7> A molded product obtained by molding the decorative film according to any one of <1> to <6>.

<8> An electronic device comprising:
the molded product according to <7>.

According to one embodiment of the present disclosure, it is possible to provide a decorative film which has different reflection patterns in a plane and has excellent designability.

According to another embodiment of the present disclosure, it is possible to provide a molded product obtained by molding the decorative film.

According to still another embodiment of the present disclosure, it is possible to provide an electronic device using the decorative film.

DESCRIPTION OF THE PREFERRED EMBODIMENTS

Figure 1:
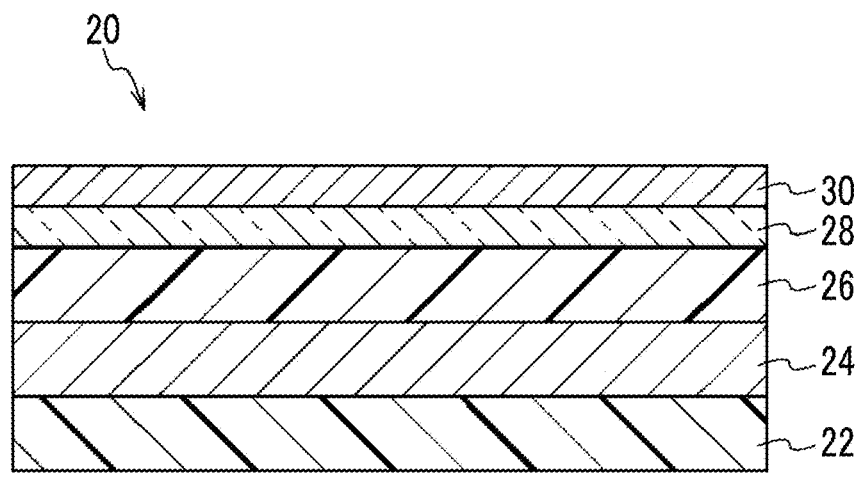
FIG. 1 is a schematic cross-sectional view showing an example of a decorative film according to an embodiment of the present disclosure.

Hereinafter, one embodiment of a decorative film according to the present disclosure will be described. However, the present disclosure is not limited to the following embodiments, and can be implemented with appropriate modification within the scope of the object of the present disclosure.

In a case where the embodiments of the present disclosure are described with reference to the drawings, the description of overlapping constituent elements and reference numerals may be omitted. The constituent elements indicated by the same reference numeral in the drawings mean the same constituent element. A dimensional ratio in the drawings does not necessarily represent the actual dimensional ratio.

In a case where substitution or unsubstitution is not noted in regard to the notation of a "group" (atomic group) in the present disclosure, the "group" includes not only a group not having a substituent but also a group having a substituent. For example, an "alkyl group" includes not only an alkyl group having no substituent (unsubstituted alkyl group), but also an alkyl group having a substituent (substituted alkyl group).

In the present disclosure, "light" means an actinic ray or radiation.

In the present disclosure, "actinic ray" or "radiation" means, for example, a bright line spectrum of a mercury lamp, far ultraviolet ray typified by an excimer laser, extreme ultraviolet ray (EUV light), X-ray, electron beam (EB), and the like.

In the present disclosure, unless otherwise specified, "exposure" includes not only exposure by a bright line spectrum of a mercury lamp, far ultraviolet ray typified by an excimer laser, extreme ultraviolet ray, X-ray, and the like, but also exposure by a particle beam such as an electron beam and an ion beam.

In the present disclosure, a numerical range expressed using "to" means a range including numerical values before and after "to" as a lower limit value and an upper limit value.

In a numerical range described in a stepwise manner in the present disclosure, an upper limit value or a lower limit value described in one numerical range may be replaced with an upper limit value or a lower limit value in another numerical range described in a stepwise manner. In addition, in a numerical range described in the present disclosure, an upper limit value or a lower limit value described in the numerical range may be replaced with a value described in an example.

In the present disclosure, (meth)acrylate represents acrylate and methacrylate, and (meth)acrylic represents acrylic and methacrylic.

In the present disclosure, a weight-average molecular weight (Mw), a number-average molecular weight (Mn), and a dispersity (also referred to as molecular weight distribution) (Mw/Mn) of a resin component are defined as a value in terms of polystyrene according to a gel permeation chromatography (GPC) measurement (solvent: tetrahydrofuran, flow amount (sample injection amount): 10 μL, column: TSK gel Multipore HXL-M manufactured by Tosoh Corporation, column temperature: 40° C., flow rate: 1.0 mL/min, detector: refractive index detector) using a GPC device (HLC-8120GPC manufactured by Tosoh Corporation).

In the present disclosure, in a case where a plurality of substances corresponding to each component in a composition is present, the amount of each component in the composition means the total amount of the plurality of substances present in the composition, unless otherwise specified.

In the present disclosure, a term "step" denotes not only an individual step but also a step which is not clearly distinguishable from another step as long as an effect expected from the step can be achieved.

In the present disclosure, a "total solid content" refers to a total mass of components obtained by removing a solvent from the whole composition of the composition. In addition, a "solid content" is a component obtained by removing a solvent from the whole composition of the composition, and for example, the component may be solid or may be liquid at 25° C.

In the present disclosure, "% by mass" has the same definition as that for "% by weight", and "part by mass" has the same definition as that for "part by weight".

In the present disclosure, a combination of two or more preferred aspects is a more preferred aspect.

(Decorative Film)

The decorative film according to one embodiment of the present disclosure is a decorative film including a reflective layer which consists of a dielectric multi-layer film and develops a color due to an optical interference or a structural color, in which the dielectric multi-layer film has a plurality of regions having different reflection performances in an in-plane direction, at least one of the plurality of regions is a region having a specular reflectivity, and at least another one of the plurality of regions is a region having a diffuse reflectivity.

With the region having a specular reflectivity and the region having a diffuse reflectivity, the decorative film according to the embodiment of the present disclosure has different reflection patterns in a plane, and a pattern shape is formed by these different reflection patterns. The pattern shape can be formed in various aspects depending on each position of the region having a specular reflectivity and the region having a diffuse reflectivity, and the type of the dielectric multi-layer film constituting the reflective layer. Therefore, in the decorative film according to the embodiment of the present disclosure, a pattern shape with a high degree of freedom can be formed, and designability is excellent.

An application of the decorative film according to one embodiment of the present disclosure is not particularly limited, and specific examples thereof include a decoration of electronic devices (for example, wearable devices and smartphones), home appliances, audio products, computers, displays, in-vehicle products, watches, accessories, optical parts, doors, window glasses, and building materials. Among these, the decorative film according to one embodiment of the present disclosure can be suitably used for a decoration of electronic devices (for example, wearable devices and smartphones). In addition, the decorative film according to one embodiment of the present disclosure is suitable as a decorative film for molding, which is used for molding such as three-dimensional molding and insert molding, and more suitable as a decorative film for three-dimensional molding.

In the related art, as a surface decoration used in articles such as home appliances, electronic apparatuses, and mobile phones, printing, for example, painting, vapor deposition, or plating has been used.

However, for example, from the aspects of problems such as functionality addition and environmental load, and the possibility of replacement, a decoration technique by using a decorative film has been widely used.

On the other hand, new designability is required from the widespread preference of users. In particular, change in color (for example, a tint and a fine hue) depending on a viewing angle is one of required designs, and a need for introducing the decoration technique to obtain the designs has been required.

In addition, in JP2001-105795A, a hot stamp foil in which a cholesteric liquid crystalline polymer layer is laminated as a transfer layer is disclosed, but the reflected color is uniform and the obtained design lacks attractiveness.

As a result of intensive studies, the present inventors have found that, with the decorative film including the above-described configuration, it is possible to provide a decorative film which has different reflection patterns in a plane and has excellent designability. The decorative film according to the embodiment of the present disclosure has excellent lustrousness.

Hereinafter, the decorative film according to the embodiment of the present disclosure will be described in detail.

<Base Material>

The decorative film according to one embodiment of the present disclosure preferably includes a base material.

The base material may be a support. As the base material, for example, a known base material in the related art as a base material used for molding such as three-dimensional molding and insert molding can be used without particular limitation, and may be appropriately selected according to suitability for molding.

A shape and a material of the base material are not particularly limited, and may be appropriately selected as desired. From the viewpoint of ease of molding and chipping resistance, the base material is preferably a resin base material, and more preferably a resin film.

In addition, the base material may have an uneven structure. For example, the uneven structure may be formed together with the reflective layer, or a base material having an uneven structure may be used as a mold for forming the uneven structure on the reflective layer.

Specific examples of the base material include a resin film including a resin such as polyethylene terephthalate (PET), polyethylene naphthalate (PEN), an acrylic resin, a urethane resin, a urethane-acrylic resin, a polycarbonate (PC) resin, an acrylic-polycarbonate resin, triacetyl cellulose (TAC), cycloolefin polymer (COP), and acrylonitrile/butadiene/styrene copolymer resin (ABS resin).

Among these, from the viewpoint of moldability and strength, the base material is preferably a resin film including an acrylic resin, polycarbonate, or polypropylene, and more preferably a resin film including an acrylic resin or polycarbonate.

In addition, the base material may be a laminated resin base material having two or more layers. Preferred examples of the laminated resin base material include a laminated film including a PET layer, an acrylic resin layer, and a polycarbonate resin layer.

The base material may contain other additives as necessary.

Examples of such additives include lubricants such as mineral oil, hydrocarbons, fatty acids, alcohols, fatty acid esters, fatty acid amides, metallic soaps, natural waxes, and silicone; inorganic flame retardants such as magnesium hydroxide and aluminum hydroxide; organic flame retardants such as a halogen-based organic flame retardant and a phosphorus-based organic flame retardant; organic or inorganic fillers such as metal powder, talc, calcium carbonate, potassium titanate, glass fibers, carbon fibers, and wood powder; additives such as an antioxidant, a UV inhibitor, a lubricant, a dispersant, a coupling agent, a foaming agent, and a colorant; and engineering plastics other than the above-described resins. Examples of the engineering plastics include polyolefins, polyesters, polyacetals, polyamides, and polyphenylene ethers.

As the base material, a commercially available product may be used.

Examples of the commercially available product include TECHNOLLOY (registered trademark) series (acrylic resin film or acrylic resin/polycarbonate resin laminated film, manufactured by Sumitomo Chemical Co., Ltd.), ABS films (manufactured by Okamoto Industries, Inc.), ABS sheets (manufactured by SEKISUI SEIKEI CO., LTD.), Teflex (registered trademark) series (PET film, manufactured by TEIJIN FILM SOLUTIONS LIMITED), Lumirror (registered trademark) easily moldable type (PET film, manufactured by TORAY INDUSTRIES, INC), and Purethermo (polypropylene film, manufactured by Idemitsu Kosan Co., Ltd.).

A thickness of the base material is determined according to, for example, the application of a molded product to be produced and handleability, and is not particularly limited. The lower limit of the thickness of the base material is preferably 1 μm or more, more preferably 10 μm or more, and still more preferably 20 μm or more. The upper limit of the thickness of the base material is preferably 250 μm or less, more preferably 150 μm or less, and particularly preferably 100 μm or less.

<Reflective Layer Consisting of Dielectric Multi-Layer Film>

The decorative film according to one embodiment of the present disclosure includes a reflective layer consisting of a dielectric multi-layer film. The above-described reflective layer is a layer developing a color due to an optical interference or a structural color.

The dielectric multi-layer film is preferably a dielectric multi-layer film having a maximal reflection wavelength in a wavelength range of 380 nm to 1,500 nm. From the viewpoint of being one of constituent elements of the decorative film, the dielectric multi-layer film preferably has a maximal reflection wavelength in a wavelength range of 380 nm to 1,200 nm, more preferably has a maximal reflection wavelength in a wavelength range of 400 nm to 1,000 nm, and particularly preferably has a maximal reflection wavelength in a wavelength range of 420 nm to 900 nm.

Examples of the dielectric multi-layer film include a cholesteric liquid crystal layer and an organic/inorganic optical multi-layer film. Among these, from the viewpoint of suitability for molding and variation of the obtained design, a cholesteric liquid crystal layer is preferable. Here, the cholesteric liquid crystal layer means a layer including a cholesteric liquid crystal.

In the decorative film according to one embodiment of the present disclosure, it is preferable that the dielectric multi-layer film has a plurality of regions having different reflection performances in an in-plane direction, at least one of the plurality of regions is a region having a specular reflectivity, and at least another one of the plurality of regions is a region having a diffuse reflectivity. With the region having a specular reflectivity and the region having a diffuse reflectivity, a pattern shape is formed. That is, in the present disclosure, the region having a specular reflectivity and the region having a diffuse reflectivity in the dielectric multi-layer film correspond to the region having a specular reflectivity and the region having a diffuse reflectivity in the decorative film.

In the present disclosure, the region having a specular reflectivity means a region in which a ratio (Rm/Ri) of a 5° specular reflectance (Rm) to an integral reflectance (Ri) at a reflected light peak wavelength is 50% or more.

In addition, in the present disclosure, the region having a diffuse reflectivity means a region in which a ratio (Rm/Ri) of a 5° specular reflectance (Rm) to an integral reflectance (Ri) at a reflected light peak wavelength is 1% or more and less than 50%.

That is, in the decorative film according to one embodiment of the present disclosure, it is preferable, in the region having a specular reflectivity, the ratio (Rm/Ri) of the 5° specular reflectance (Rm) to the integral reflectance (Ri) at the reflected light peak wavelength is 50% or more, and in the region having a diffuse reflectivity, the ratio (Rm/Ri) of the 5° specular reflectance to the integral reflectance at the reflected light peak wavelength is 1% or more and less than 50%.

In the region having a specular reflectivity, the ratio (Rm/Ri) of the 5° specular reflectance (Rm) to the integral reflectance (Ri) at the reflected light peak wavelength is more preferably 60% or more and still more preferably 70% or more.

In the region having a diffuse reflectivity, the ratio (Rm/Ri) of the 5° specular reflectance (Rm) to the integral reflectance (Ri) at the reflected light peak wavelength is more preferably 5% or more and less than 40%, and still more preferably 8% or more and less than 30%.

In the present disclosure, the ratio (Rm/Ri) of the 5° specular reflectance (Rm) to the integral reflectance (Ri) at the reflected light peak wavelength is a value which is determined by measuring the integral reflectance (Ri) and the 5° specular reflectance using a spectrophotometer, and rounding off the first decimal point of the value obtained by dividing the obtained 5° specular reflectance (Rm) by the integral reflectance (Ri).

As the spectrophotometer, for example, a spectrophotometer "V-670" manufactured by JASCO Corporation can be used.

A method of forming the region having a specular reflectivity and the region having a diffuse reflectivity included in the decorative film according to one embodiment of the present disclosure is preferably a method in which, in the reflective layer, at least one region of the dielectric multi-layer film is formed so as to be the region having a specular reflectivity, and at least another region of the dielectric multi-layer film is formed so as to be the region having a diffuse reflectivity.

In the reflective layer, in a case where the dielectric multi-layer film is a cholesteric liquid crystal layer, examples of the method of forming the region having a specular reflectivity and the region having a diffuse reflectivity include a method of forming a plurality of regions having different degrees of rubbing treatment for aligning liquid crystals, and a method of forming regions having different degrees of photoalignment treatment for aligning liquid crystals.

Examples of the method of forming regions having different degrees of rubbing treatment for aligning liquid crystals include the methods shown in (A), (B), and (C) below.

(A) method of superimposing, on an alignment layer, a mask patterned with a high void ratio in a low diffusivity region and a low void ratio in a low diffusivity region, and performing rubbing treatment through the mask (B) method of superimposing, on an alignment layer which has been subjected to rubbing treatment, a mask patterned with a low void ratio in a low diffusivity region and a high void ratio in a low diffusivity region, and applying heat, solvent, or steam to the alignment layer through the mask to eliminate alignment (C) method of patterning and printing an alignment layer so as to be aligned according to the region having a specular reflectivity and the region having a diffuse reflectivity In the methods of (A) and (B) described above, a pattern shape of the mask used is not particularly limited as long as it can form the region having a specular reflectivity and the region having a diffuse reflectivity. The pattern shape of the mask may be optionally determined according to the desired pattern shape.

The aspect of applying heat, solvent, or steam in the method of (B) described above is not limited as long as the shape of the alignment layer itself can be maintained and the alignment can be eliminated.

In a case of applying heat, for example, the alignment layer may be heated by using a heating unit such as an infrared laser and a hot air dryer. A heating temperature of the alignment layer can be, for example, 50° C. to 150° C.

In a case of applying solvent, as the solvent, a solvent such as ethanol and methyl ethyl ketone can be used. The method of applying the solvent is not particularly limited, and examples thereof include immersion coating, spray coating, and bar coating.

In a case of applying steam, for example, steam at 50° C. to 120° C. in a case of being in contact with the alignment layer may be applied. An application time of the steam can be, for example, 0.1 seconds to 60 seconds.

Examples of the method of forming regions having different degrees of photoalignment treatment for aligning liquid crystals include the method shown in (D) below.

(D) method of performing laser writing, mask irradiation, or the like on the cholesteric liquid crystal layer Among the above-described methods, the method of (B) or (D) is more preferable.

The rubbing treatment and the photoalignment treatment will be described in detail in the description of the cholesteric liquid crystal layer described later.

In the reflective layer, in a case where the dielectric multi-layer film is an organic/inorganic optical multi-layer film, for example, the region having a specular reflectivity and the region having a diffuse reflectivity may be formed by molding a mold having an uneven structure and forming an uneven portion on the reflective layer to impart the diffuse reflectivity.

<<Cholesteric Liquid Crystal Layer>>

The dielectric multi-layer film used in the present disclosure is preferably a cholesteric liquid crystal layer. The cholesteric liquid crystal layer is a layer obtained by curing a liquid crystal composition including a liquid crystal compound. That is, the cholesteric liquid crystal layer is a layer in which a liquid crystal compound is immobilized in a cholesteric alignment state.

(Liquid Crystal Composition)

The liquid crystal composition is a composition containing at least a liquid crystal compound, and may contain a component other than the liquid crystal compound.

From the viewpoint of moldability, as the liquid crystal compound, it is preferable to use at least a cholesteric liquid crystal compound having one ethylenically unsaturated group or one cyclic ether group. For example, the liquid crystal composition for forming the cholesteric liquid crystal layer contains, with respect to a total solid content of the liquid crystal composition, 25% by mass or more of the cholesteric liquid crystal compound having one ethylenically unsaturated group or one cyclic ether group, and furthermore, may contain other components (for example, a chiral agent, an alignment control agent, a polymerization initiator, and an alignment assistant).

—Cholesteric Liquid Crystal Compound Having One Ethylenically Unsaturated Group or One Cyclic Ether Group—

It is preferable that the liquid crystal composition contains, as the liquid crystal compound, 25% by mass or more of a cholesteric liquid crystal compound (hereinafter, also referred to as a "specific liquid crystal compound") having one ethylenically unsaturated group or one cyclic ether group.

The ethylenically unsaturated group in the specific liquid crystal compound is not particularly limited, and examples thereof include a (meth)acryloxy group, a (meth)acrylamide group, a vinyl group, a vinyl ester group, and a vinyl ether group. As the ethylenically unsaturated group, from the viewpoint of reactivity, a (meth)acryloxy group, a (meth)acrylamide group, or an aromatic vinyl group is preferable, a (meth)acryloxy group or a (meth)acrylamide group is more preferable, and a (meth)acryloxy group is particularly preferable.

The cyclic ether group in the specific liquid crystal compound is not particularly limited, but from the viewpoint of reactivity, an epoxy group or an oxetanyl group is preferable, and an oxetanyl group is particularly preferable.

From the viewpoint of reactivity, and suppressing change in reflectance and change in tint after molding of the decorative film, the specific liquid crystal compound is preferably a cholesteric liquid crystal compound having one ethylenically unsaturated group. The liquid crystal composition more preferably contains 25% by mass or more of the cholesteric liquid crystal compound having one ethylenically unsaturated group with respect to the total solid content of the liquid crystal composition.

The specific liquid crystal compound may have both ethylenically unsaturated group and cyclic ether group in one molecule, but it is assumed that the number of ethylenically unsaturated groups is 1 or the number of cyclic ether groups is 1. In addition, in a case where the number of ethylenically unsaturated groups in the specific liquid crystal compound is 1, for example, the specific liquid crystal compound may be a compound having one ethylenically unsaturated group and one or more cyclic ether groups.

In a case where the liquid crystal composition includes the specific liquid crystal compound having one ethylenically unsaturated group, from the viewpoint of suppressing change in reflectance and change in tint after molding of the decorative film, the above-described liquid crystal composition preferably includes a radical polymerization initiator, and more preferably includes a photoradical polymerization initiator.

In a case where the liquid crystal composition includes the specific liquid crystal compound having one cyclic ether group, from the viewpoint of suppressing change in reflectance and change in tint after molding of the decorative film, the above-described liquid crystal composition preferably includes a cationic polymerization initiator, and more preferably includes a photocationic polymerization initiator.

From the viewpoint of suppressing change in reflectance and change in tint after molding of the decorative film, the specific liquid crystal compound is preferably a cholesteric liquid crystal compound having both ethylenically unsaturated group and cyclic ether group, and more preferably a cholesteric liquid crystal compound having one ethylenically unsaturated group and one cyclic ether group.

It is sufficient that the specific liquid crystal compound is a compound having a liquid crystal structure, and the specific liquid crystal compound may be a rod-like liquid crystal compound or a discotic liquid crystal compound. From the viewpoint of ease of adjusting a pitch of a helical structure in the cholesteric liquid crystal layer, and viewpoint of suppressing change in reflectance and change in tint after molding of the decorative film, the specific liquid crystal compound is preferably a rod-like liquid crystal compound.

As the rod-like liquid crystal compound, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, or alkenylcyclohexylbenzonitriles are preferably used. In addition to the above-described low-molecular weight liquid crystal compounds, a liquid crystalline polymer compound can also be used. As the rod-like liquid crystal compound, a compound having one ethylenically unsaturated group or one cyclic ether group, among compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-80081A (JP-H11-80081A), JP2001-328973A, and the like, can be used. Furthermore, as the rod-like liquid crystal compound, for example, a compound having one ethylenically unsaturated group or one cyclic ether group, among compounds described in JP1999-513019A (JP-H11-513019A) and JP2007-279688A, can also be preferably used.

The cholesteric liquid crystal layer is more preferably a layer in which the alignment is fixed by polymerizing the rod-like liquid crystal compound.

As the discotic liquid crystal compound, for example, a compound having one ethylenically unsaturated group or one cyclic ether group, among compounds described in JP2007-108732A or JP2010-244038A, can be preferably used.

Preferred specific examples of the specific liquid crystal compound include compounds shown below, but it is needless to say that the specific liquid crystal compound is not limited thereto.

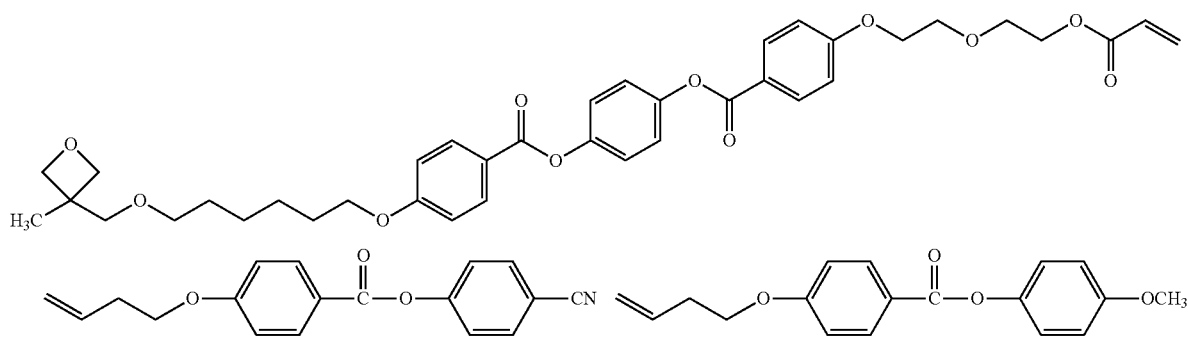

-continued
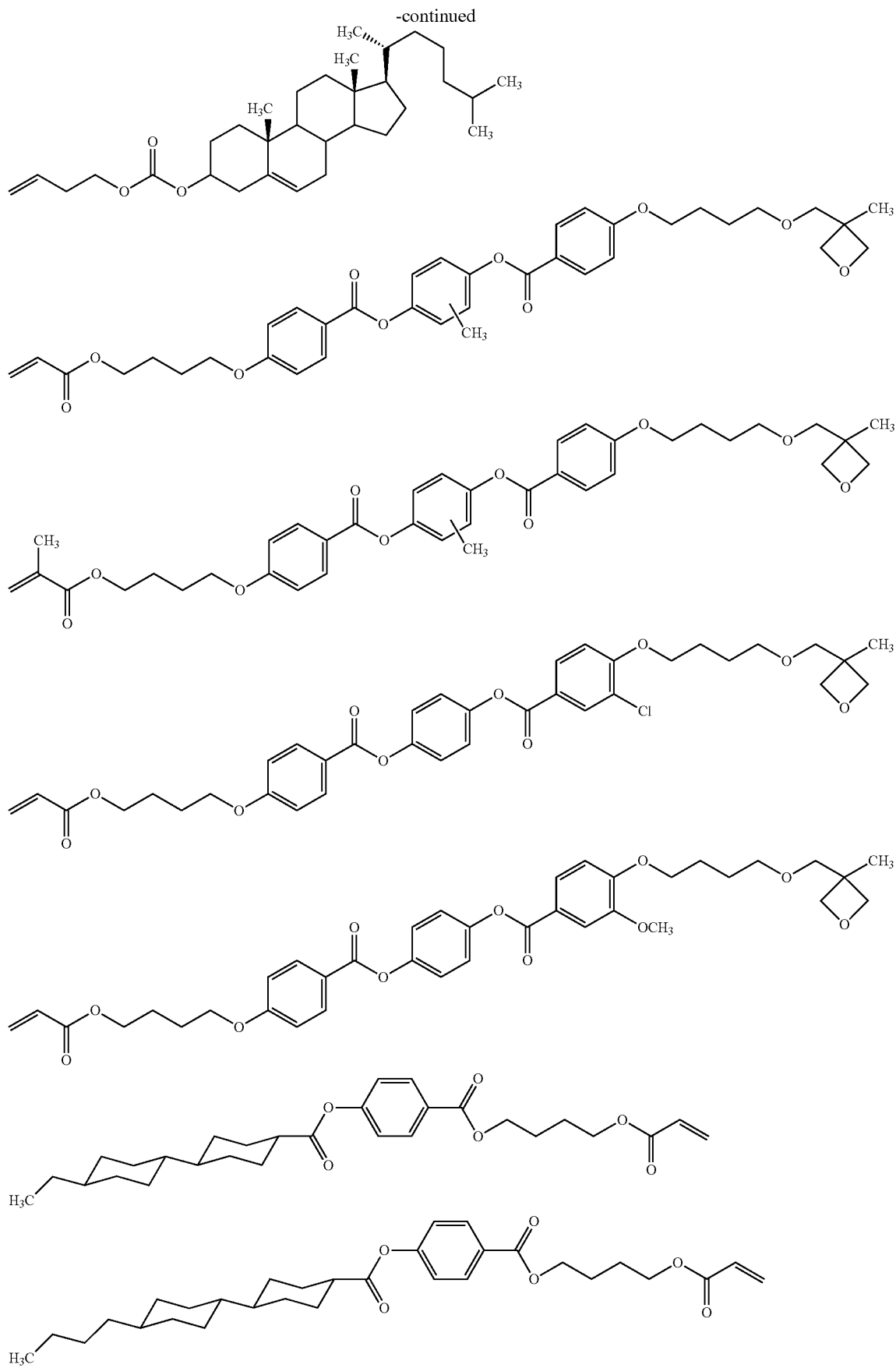

-continued

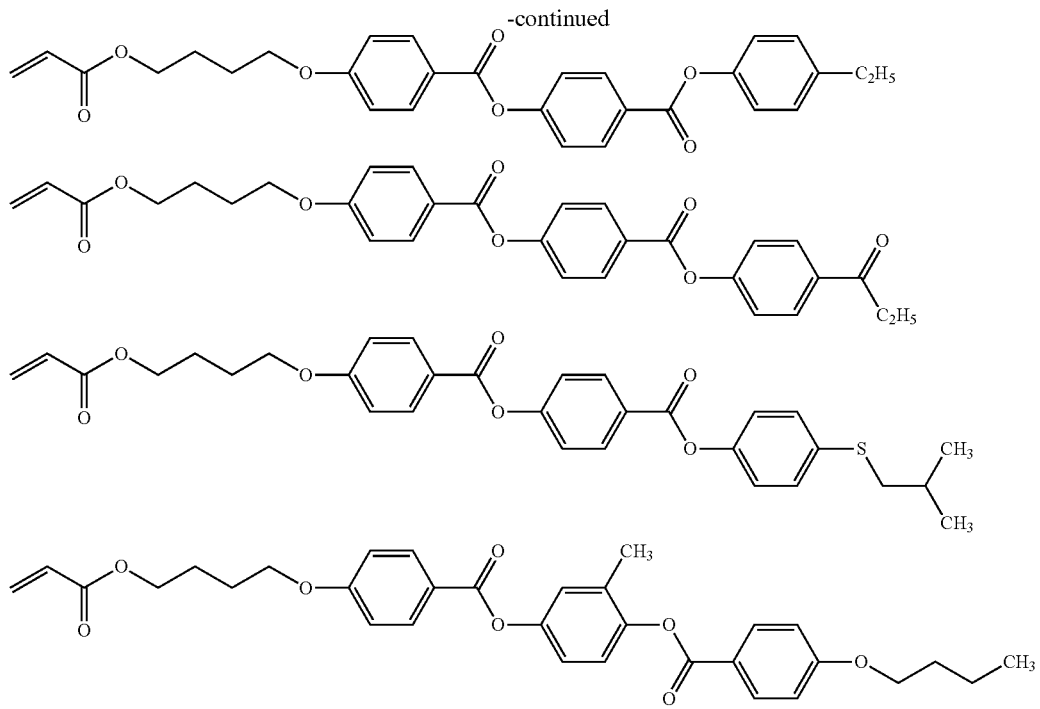

The liquid crystal composition may include one specific liquid crystal compound alone, or may include two or more specific liquid crystal compounds.

A content of the specific liquid crystal compound is preferably 25% by mass or more with respect to the total solid content of the liquid crystal composition. In a case where the content of the specific liquid crystal compound is 25% by mass or more, a decorative film which has a small change in reflectance after molding is obtained.

In addition, from the viewpoint of suppressing change in reflectance and change in tint after molding, with respect to the total solid content of the liquid crystal composition, the content of the specific liquid crystal compound is preferably 30% by mass or more, more preferably 40% by mass or more, still more preferably 60% by mass to 99% by mass, and particularly preferably 80% by mass to 98% by mass.

—Other Cholesteric Liquid Crystal Compound—

The liquid crystal composition may include other cholesteric liquid crystal compounds (hereinafter, also simply referred to as "other liquid crystal compounds") other than the specific liquid crystal compound.

Examples of other liquid crystal compounds include cholesteric liquid crystal compounds having no ethylenically unsaturated group and cyclic ether group, cholesteric liquid crystal compounds having two or more ethylenically unsaturated groups and no cyclic ether group, cholesteric liquid crystal compounds having two or more cyclic ether groups and no ethylenically unsaturated group, and cholesteric liquid crystal compounds having two or more ethylenically unsaturated groups and two or more cyclic ether groups.

Among these, from the viewpoint of suppressing change in reflectance and change in tint after molding of the decorative film, the other liquid crystal compounds are preferably at least one compound selected from the group consisting of cholesteric liquid crystal compounds having no ethylenically unsaturated group and no cyclic ether group, cholesteric liquid crystal compounds having two or more ethylenically unsaturated groups and no cyclic ether group, or cholesteric liquid crystal compounds having two or more cyclic ether groups and no ethylenically unsaturated group, more preferably at least one compound selected from the group consisting of cholesteric liquid crystal compounds having no ethylenically unsaturated group and no cyclic ether group, cholesteric liquid crystal compounds having two ethylenically unsaturated groups and no cyclic ether group, or cholesteric liquid crystal compounds having two cyclic ether groups and no ethylenically unsaturated group, and particularly preferably at least one compound selected from the group consisting of cholesteric liquid crystal compounds having no ethylenically unsaturated group and no cyclic ether group or cholesteric liquid crystal compounds having two ethylenically unsaturated groups and no cyclic ether group.

As the other liquid compounds, a known cholesteric liquid crystal compound can be used.

As a rod-like liquid crystal compound in the other liquid crystal compounds, compounds described in "Makromol. Chem., vol. 190, p. 2255 (1989), Advanced Materials, vol. 5, p. 107 (1993)", U.S. Pat. Nos. 4,683,327A, 5,622,648A, 5,770,107A, WO1995/22586A, WO1995/24455A, WO1997/00600A, WO1998/23580A, WO1998/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A can be used. Furthermore, as the rod-like liquid crystal compound, for example, compounds described in JP1999-513019A (JP-H11-513019A) or JP2007-279688A can also be preferably used.

As the discotic liquid crystal compound in the other liquid crystal compounds, for example, compounds described in JP2007-108732A or JP2010-244038A can be preferably used.

The liquid crystal composition may include other liquid crystal compound alone, or may include two or more other liquid crystal compounds.

From the viewpoint of suppressing change in reflectance and change in tint after molding, with respect to the total solid content of the liquid crystal composition, the content of the other liquid crystal compounds is preferably 70% by mass or less, more preferably 60% by mass or less, still more preferably 40% by mass or less, and particularly preferably 5% by mass or less. The lower limit value of the content of the other liquid crystal compounds is 0% by mass.

—Chiral Agent (Optically Active Compound)—

From the viewpoint of ease of forming a cholesteric liquid crystal layer and ease of adjusting the pitch of the helical structure, the liquid crystal composition preferably includes a chiral agent (that is, an optically active compound). The chiral agent has a function of inducing a helical structure in the cholesteric liquid crystal layer. Since a twist direction or helical pitch of the helix induced by the chiral agent is different depending on the liquid crystal compound, the chiral agent may be selected according to the purpose. The chiral agent is not particularly limited, and a known compound (for example, compounds described in "Liquid Crystal Device Handbook", Chapter 3, Section 4-3, chiral agent for twisted nematic (TN) and super-twisted nematic (STN), p. 199, Japan Society for the Promotion of Science edited by the 142nd committee, 1989), or a derivative of isosorbide, isomannide, and the like can be used. The chiral agent generally includes an asymmetric carbon atom, but an axially asymmetric compound or a surface asymmetric compound, which does not have the asymmetric carbon atom, can also be used as the chiral agent.

Preferred examples of the axially asymmetric compound or the surface asymmetric compound include a binaphthyl compound, a helicene compound, and a paracyclophane compound.

From the viewpoint of suppressing change in reflectance after molding, the liquid crystal composition preferably includes, as the chiral agent, a chiral agent having a polymerizable group, and more preferably includes, as the chiral agent, a chiral agent having a polymerizable group and a chiral agent not having a polymerizable group. The polymerizable group is not particularly limited as long as the group is polymerizable, but from the viewpoint of reactivity and viewpoint of suppressing change in reflectance after molding, the polymerizable group is preferably an ethylenically unsaturated group or a cyclic ether group, and more preferably an ethylenically unsaturated group.

Preferred aspects of the ethylenically unsaturated group and cyclic ether group in the chiral agent are the same as the preferred aspects of the ethylenically unsaturated group and cyclic ether group in the above-described specific liquid crystal compound, respectively.

In a case where the chiral agent has an ethylenically unsaturated group or a cyclic ether group, from the viewpoint of reactivity and viewpoint of suppressing change in reflectance after molding of the decorative film, it is preferable that the ethylenically unsaturated group or cyclic ether group included in the specific liquid crystal compound has the same type of the ethylenically unsaturated group or cyclic ether group included in the chiral agent (for example, an ethylenically unsaturated group, preferably a (meth) acryloxy group), and it is more preferable to be the same group.

From the viewpoint of reactivity and viewpoint of suppressing change in reflectance after molding, the chiral agent having a polymerizable group is preferably a chiral agent having two or more polymerizable groups, more preferably a chiral agent having two or more ethylenically unsaturated groups or a chiral agent having two or more cyclic ether groups, and particularly preferably a chiral agent having two or more ethylenically unsaturated groups.

The chiral agent may be a cholesteric liquid crystal compound.

As will be described later, in a case of controlling a size of the helical pitch of the cholesteric liquid crystal layer by irradiating the cholesteric liquid crystal layer with light during manufacturing of the cholesteric liquid crystal layer, the liquid crystal composition preferably includes a chiral agent (hereinafter, also referred to as a "photosensitive chiral agent") capable of changing the helical pitch of the cholesteric liquid crystal layer in response to light. The photosensitive chiral agent is a compound in which the structure can be changed by absorbing light, thereby being capable of changing the helical pitch of the cholesteric liquid crystal layer. As such a compound, a compound which causes at least one of a photoisomerization reaction, a photodimerization reaction, or a photodegradation reaction is preferable.

The compound which causes a photoisomerization reaction refers to a compound which causes stereoisomerization or structural isomerization by the action of light. Examples of the compound which causes a photoisomerization reaction include an azobenzene compound and a spiropyran compound. In addition, the compound which causes a photodimerization reaction refers to a compound which causes an addition reaction between two groups so as to be cyclized by irradiation with light. Examples of the compound which causes a photodimerization reaction include a cinnamic acid derivative, a coumarin derivative, a chalcone derivative, and a benzophenone derivative.

In addition, the light is not particularly limited, and examples thereof include ultraviolet light, visible light, and infrared light.

Preferred examples of the photosensitive chiral agent include a chiral agent represented by Formula (CH1). The chiral agent represented by Formula (CH1) can change the alignment structure such as the helical pitch (for example, helical cycle and twist cycle) of a cholesteric liquid crystal layer according to the amount of light during irradiation with the light.

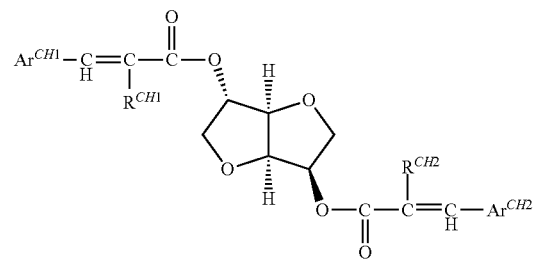

(CH1)

In Formula (CH1), $Ar^{CH1}$ and $Ar^{CH2}$ each independently represent an aryl group or a heteroaromatic ring group, and $R^{CH1}$ and $R^{CH2}$ each independently represent a hydrogen atom or a cyano group.

In Formula (CH1), it is preferable that $Ar^{CH1}$ and $Ar^{CH2}$ are each independently an aryl group.

The aryl group of $Ar^{CH1}$ and $Ar^{CH2}$ in Formula (CH1) may have a substituent, and the aryl group thereof preferably has a total carbon number of 6 to 40, and more preferably has a total carbon number of 6 to 30. As the substituent, for example, a halogen atom, an alkyl group, an alkenyl group, an alkynyl group, an alkoxy group, a hydroxy group, an acyl group, an alkoxycarbonyl group, an aryloxycarbonyl group, an acyloxy group, a carboxy group, a cyano group, or a heterocyclic group is preferable, and a halogen atom, an alkyl group, an alkenyl group, an alkoxy group, a hydroxy group, an acyloxy group, an alkoxycarbonyl group, or an aryloxycarbonyl group is more preferable.

In Formula (CH1), it is preferable that $Ar^{CH1}$ and $Ar^{CH2}$ are each independently an aryl group. The aryl group of $Ar^{CH1}$ and $Ar^{CH2}$ in Formula (CH1) preferably has a total carbon number of 6 to 40, and more preferably has a total carbon number of 6 to 30. The aryl group may have a substituent. As the substituent, for example, a halogen atom, an alkyl group, an alkenyl group, an alkynyl group, an alkoxy group, a hydroxy group, an acyl group, an alkoxycarbonyl group, an aryloxycarbonyl group, an acyloxy group, a carboxy group, a cyano group, or a heterocyclic group is preferable, and a halogen atom, an alkyl group, an alkenyl group, an alkoxy group, a hydroxy group, an acyloxy group, an alkoxycarbonyl group, or an aryloxycarbonyl group is more preferable.

As $Ar^{CH1}$ and $Ar^{CH2}$, an aryl group represented by Formula (CH2) or Formula (CH3) is preferable.

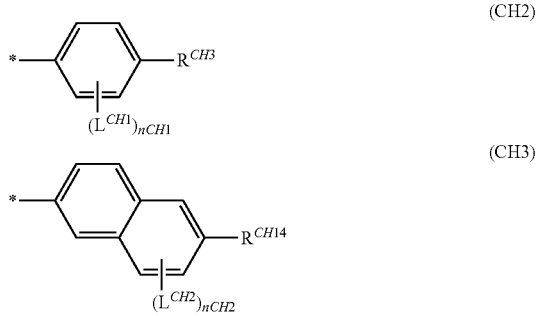

In Formula (CH2) and Formula (CH3), $R^{CH3}$ and $R^{CH4}$ each independently represent a hydrogen atom, a halogen atom, an alkyl group, an alkenyl group, an alkynyl group, an aryl group, a heterocyclic group, an alkoxy group, a hydroxy group, an acyl group, an alkoxycarbonyl group, an aryloxycarbonyl group, an acyloxy group, a carboxy group, or a cyano group, $L^{CH1}$ and $L^{CH2}$ each independently represent a halogen atom, an alkyl group, an alkoxy group, or a hydroxy group, nCH1 represents an integer of 0 to 4, nCH2 represents an integer of 0 to 6, and * represents a bonding position with C forming an ethylene unsaturated bond in Formula (CH1).

In Formula (CH2) and Formula (CH3), $R^{CH3}$ and $R^{CH4}$ are each independently preferably a hydrogen atom, a halogen atom, an alkyl group, an alkenyl group, an aryl group, an alkoxy group, a hydroxy group, an alkoxycarbonyl group, an aryloxycarbonyl group, or an acyloxy group, more preferably an alkoxy group, a hydroxy group, or an acyloxy group, and particularly preferably an alkoxy group.

In Formula (CH2) and Formula (CH3), $L^{CH1}$ and $L^{CH2}$ are each independently preferably an alkoxy group having 1 to 10 carbon atoms, or a hydroxy group.

nCH1 in Formula (CH2) is preferably 0 or 1.
nCH2 in Formula (CH3) is preferably 0 or 1.

The heteroaromatic ring group of $Ar^{CH1}$ and $Ar^{CH2}$ in Formula (CH1) preferably has a total carbon number of 4 to 40, and more preferably has a total carbon number of 4 to 30. The heteroaromatic ring group may have a substituent. As the substituent, for example, a halogen atom, an alkyl group, an alkenyl group, an alkynyl group, an aryl group, an alkoxy group, a hydroxy group, an acyl group, an alkoxycarbonyl group, an aryloxycarbonyl group, an acyloxy group, or a cyano group is preferable, and a halogen atom, an alkyl group, an alkenyl group, an aryl group, an alkoxy group, or an acyloxy group is more preferable.

As the heteroaromatic ring group, a pyridyl group, a pyrimidinyl group, a furyl group, or a benzofuranyl group is preferable, and a pyridyl group or a pyrimidinyl group is more preferable.

In Formula (CH1), it is preferable that $R^{CH1}$ and $R^{CH2}$ are each independently a hydrogen atom.

The liquid crystal composition may include one chiral agent alone, or may include two or more chiral agents. A content of the chiral agent can be appropriately selected according to a desired pitch of the structure or helical structure of the specific liquid crystal compound to be used. From the viewpoint of ease of forming a cholesteric liquid crystal layer and ease of adjusting the pitch of the helical structure, and viewpoint of suppressing change in reflectance after molding of the decorative film, the content of the chiral agent is preferably 1% by mass to 20% by mass, more preferably 2% by mass to 15% by mass, and particularly preferably 3% by mass to 10% by mass with respect to the total solid content of the liquid crystal composition.

In a case where the liquid crystal composition contains a chiral agent having a polymerizable group as the chiral agent, from the viewpoint of suppressing change in reflectance after molding, the content of the chiral agent having a polymerizable group is preferably 0.2% by mass to 15% by mass, more preferably 0.5% by mass to 10% by mass, still more preferably 1% by mass to 8% by mass, and particularly preferably 1.5% by mass to 5% by mass with respect to the total solid content of the liquid crystal composition.

In a case where the liquid crystal composition contains a chiral agent not having a polymerizable group as the chiral agent, from the viewpoint of suppressing change in reflectance after molding, the content of the chiral agent not having a polymerizable group is preferably 0.2% by mass to 20% by mass, more preferably 0.5% by mass to 15% by mass, and particularly preferably 1.5% by mass to 10% by mass with respect to the total solid content of the liquid crystal composition.

In addition, the pitch of the helical structure of the cholesteric liquid crystal in the cholesteric liquid crystal layer, and the selective reflection wavelength and its range described later can be easily adjusted by changed not only by adjusting the type of the liquid crystal compound used but also by adjusting the content of the chiral agent. Although it cannot be said unconditionally, in a case where the content of the chiral agent in the liquid crystal composition is doubled, the above-described pitch may be halved and the center value of the above-described selective reflection wavelength may be halved.

—Polymerization Initiator—

The liquid crystal composition preferably includes a polymerization initiator, and more preferably includes a photopolymerization initiator.

In a case where the liquid crystal composition includes a cholesteric liquid crystal compound having one ethylenically unsaturated group, from the viewpoint of suppressing change in reflectance and change in tint after molding of the decorative film, the liquid crystal composition preferably includes a radical polymerization initiator, and more preferably includes a photoradical polymerization initiator.

In a case where the liquid crystal composition includes a cholesteric liquid crystal compound having one cyclic ether group, from the viewpoint of suppressing change in reflectance and change in tint after molding of the decorative film, the liquid crystal composition preferably includes a cationic polymerization initiator, and more preferably includes a photocationic polymerization initiator.

In addition, it is preferable that the above-described liquid crystal composition includes only one of the radical polymerization initiator or the cationic polymerization initiator as the polymerization initiator.

As the polymerization initiator, a known polymerization initiator can be used. In addition, the polymerization initiator is preferably a photopolymerization initiator capable of initiating a polymerization reaction by ultraviolet irradiation. Examples of the photopolymerization initiator include α-carbonyl compounds (described in U.S. Pat. Nos. 2,367,661A and 2,367,670A), acyloin ether compounds (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimer and p-aminophenyl ketone (described in U.S. Pat. No. 3,549,367A), acridine compounds and phenazine compounds (described in JP1985-105667A (JP-S60-105667A) and U.S. Pat. No. 4,239,850A), and oxadiazole compounds (described in U.S. Pat. No. 4,212,970A).

As the photoradical polymerization initiator, a known photoradical polymerization initiator can be used. Preferred examples of the photoradical polymerization initiator include α-hydroxyalkylphenone compounds, α-aminoalkylphenone compounds, and acylphosphine oxide compounds.

As the photocationic polymerization initiator, a known photocationic polymerization initiator can be used. Preferred examples of the photocationic polymerization initiator include iodonium salt compounds and sulfonium salt compounds.

The liquid crystal composition may include one polymerization initiator alone, or may include two or more polymerization initiators. A content of the polymerization initiator can be appropriately selected according to a desired pitch of the structure or helical structure of the specific liquid crystal compound to be used. From the viewpoint of ease of forming a cholesteric liquid crystal layer, ease of adjusting the pitch of the helical structure, a polymerization rate, and the strength of the cholesteric liquid crystal layer, the content of the polymerization initiator is preferably 0.05% by mass to 10% by mass, more preferably 0.05% by mass to 5% by mass, still more preferably 0.1% by mass to 2% by mass, and particularly preferably 0.2% by mass to 1% by mass with respect to the total solid content of the above-described liquid crystal composition.

—Crosslinking Agent—

The liquid crystal composition may include a crosslinking agent in order to improve the strength and durability of the cholesteric liquid crystal layer after curing. As the crosslinking agent, for example, a crosslinking agent which cures with ultraviolet rays, heat, or humidity can be suitably used. The crosslinking agent is not particularly limited and can be appropriately selected according to the purpose, and examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in the side chain; and alkoxysilane compounds such as vinyltrimethoxysilane and N-(2-aminoethyl) 3-aminopropyltrimethoxysilane. In addition, a known catalyst can be used depending on reactivity of the crosslinking agent, and in addition to improving the strength and durability of the cholesteric liquid crystal layer, productivity can be improved.

The liquid crystal composition may include one crosslinking agent alone, or may include two or more crosslinking agents. From the viewpoint of the strength and durability of the cholesteric liquid crystal layer, a content of the crosslinking agent is preferably 1% by mass to 20% by mass and more preferably 3% by mass to 15% by mass with respect to the total solid content of the liquid crystal composition.

—Polyfunctional Polymerizable Compound—

From the viewpoint of suppressing the change in reflectance after molding of the decorative film, the liquid crystal composition preferably includes a polyfunctional polymerizable compound and more preferably includes a polyfunctional polymerizable compound having the same type of polymerizable group. Examples of the polyfunctional polymerizable compound include, in the above-described other cholesteric liquid crystal compounds, cholesteric liquid crystal compounds having two or more ethylenically unsaturated groups and no cyclic ether group; cholesteric liquid crystal compounds having two or more cyclic ether groups and no ethylenically unsaturated group; cholesteric liquid crystal compounds having two or more ethylenically unsaturated groups and two or more cyclic ether groups; chiral agents having two or more polymerizable groups in the above-described chiral agent; and the above-described crosslinking agent.

As the polyfunctional polymerizable compound, at least one compound selected from the group consisting of cholesteric liquid crystal compounds two or more ethylenically unsaturated groups and no cyclic ether group, cholesteric liquid crystal compounds having two cyclic ether groups and no ethylenically unsaturated group, and chiral agents having two or more polymerizable groups is preferable, and chiral agents having two or more polymerizable groups are more preferable.

The liquid crystal composition may include one polyfunctional polymerizable compound alone, or may include two or more polyfunctional polymerizable compounds. From the viewpoint of suppressing change in reflectance after molding of the decorative film, a content of the polyfunctional polymerizable compound is preferably 0.5% by mass to 70% by mass, more preferably 1% by mass to 50% by mass, still more preferably 1.5% by mass to 20% by mass, and particularly preferably 2% by mass to 10% by mass with respect to the total solid content of the liquid crystal composition.

—Other Additives—

The liquid crystal composition may include other additives other than those described above as necessary. As other additives, a known additive can be used, and examples thereof include a surfactant, a polymerization inhibitor, an antioxidant, a horizontal alignment agent, an ultraviolet absorber, a light stabilizer, a colorant, and metal oxide particles.

The liquid crystal composition may include a solvent. The solvent is not particularly limited and can be appropriately selected according to the purpose, but an organic solvent is preferably used.

The organic solvent is not particularly limited and can be appropriately selected according to the purpose, and examples thereof include ketones (for example, methyl ethyl ketone and methyl isobutyl ketone), alkyl halides, amides, sulfoxides, heterocyclic compounds, hydrocarbons, esters, and ethers. The solvent may be used singly, or two or more kinds thereof may be used in combination. Among these, in consideration of environmental load, ketones are particularly preferable. In addition, the above-described component may function as the solvent.

A content of the solvent in the liquid crystal composition is not particularly limited, and may be adjusted to a content of the solvent such that a desired coatability is obtained. A content of solid contents with respect to the total mass of the liquid crystal composition is not particularly limited, but is preferably 1% by mass to 90% by mass, more preferably 5% by mass to 80% by mass, and particularly preferably 10% by mass to 80% by mass. The content of the solvent in the liquid crystal composition during curing in a case of forming the cholesteric liquid crystal layer is preferably 5% by mass or less, more preferably 3% by mass or less, still more preferably 2% by mass or less, and particularly preferably 1% by mass or less with respect to the total solid content of the liquid crystal composition. In addition, the content of the solvent in the cholesteric liquid crystal layer obtained by curing the liquid crystal composition is preferably 5% by mass or less, more preferably 3% by mass or less, still more preferably 2% by mass or less, and particularly preferably 1% by mass or less with respect to the total mass of the cholesteric liquid crystal layer.

—Coating and Curing of Liquid Crystal Composition—

In the formation of the cholesteric liquid crystal layer, for example, the liquid crystal composition is used by being applied to an object (for example, the above-described base material, and an alignment layer described later). After the liquid crystal composition is made into a solution with a solvent or made into a liquid such as a molten liquid by heating, the liquid crystal composition can be applied, for example, by an appropriate method such as a roll coating method, a gravure printing method, and a spin coating method. The liquid crystal composition can also be applied by various methods such as a wire bar coating method, an extrusion coating method, a direct gravure coating method, a reverse gravure coating method, and a die-coating method. In addition, using an inkjet device, the liquid crystal composition can be jetted from a nozzle to form a coating film (referring to a film-like liquid crystal composition formed by coating).

After the application of the liquid crystal composition, the cholesteric liquid crystal layer is formed by curing the liquid crystal composition. By curing the liquid crystal composition, the alignment state of molecules of the liquid crystal compound (for example, the above-described specific liquid crystal compound) is maintained and fixed. The curing of the liquid crystal composition is preferably performed by a polymerization reaction of polymerizable groups (for example, ethylenically unsaturated groups or cyclic ether groups) included in the liquid crystal compound. In a case of using the solvent as a component of the liquid crystal composition, after the application of the liquid crystal composition and before the polymerization reaction for curing, it is preferable that the coating film is dried by a known method. For example, the coating film may be dried by allowing to stand or by heating. It is sufficient that the liquid crystal compound in the liquid crystal composition is aligned after the application and drying of the liquid crystal composition.

—Selective Reflectivity of Cholesteric Liquid Crystal Layer—

The cholesteric liquid crystal layer preferably has selective reflectivity in a specific wavelength range.

Having selective reflectivity means having a specific wavelength range which satisfies the selective reflection wavelength.

In the present disclosure, the selective reflection wavelength refers to an average value of two wavelengths indicating $T\frac{1}{2}$ (%): a half-value transmittance expressed by the following expression, in a case where the minimum value of the transmittance of a target object (for example, the cholesteric liquid crystal layer) is defined as Tmin (%).

Expression for calculating half-value transmittance:
$$T\frac{1}{2}=100-(100-Tmin)/2$$

The selective reflection wavelength in the cholesteric liquid crystal layer is not particularly limited, and for example, can be set to any range of visible light (380 nm to 780 nm) and near-infrared light (more than 780 nm and 2,000 nm or less).

It is preferable that the cholesteric liquid crystal layer has selective reflectivity in at least a part of a wavelength range of 380 nm to 1,200 nm.

—Layer Configuration of Cholesteric Liquid Crystal Layer—

The cholesteric liquid crystal layer included in the decorative film according to the embodiment of the present disclosure may be one layer or two or more layers. In some aspects of the decorative film, from the viewpoint of suppressing change in reflectance after molding, it is preferable to have two or more cholesteric liquid crystal layers. Each of the two or more cholesteric liquid crystal layers may be a layer having the same composition, or may be a layer having a different composition.

In a case where the decorative film according to the embodiment of the present disclosure has two or more cholesteric liquid crystal layers, it is preferable that the decorative film according to the embodiment of the present disclosure has at least one layer formed by curing a liquid crystal composition which includes, with respect to the total solid content of the liquid crystal composition, 25% by mass or more of the cholesteric liquid crystal compound having one ethylenically unsaturated group or one cyclic ether group. From the viewpoint of suppressing change in reflectance after molding of the decorative film, it is preferable that all the two or more cholesteric liquid crystal layers are a layer formed by curing a liquid crystal composition which includes, with respect to the total solid content of the liquid crystal composition, 25% by mass or more of the cholesteric liquid crystal compound having one ethylenically unsaturated group or one cyclic ether group.

In a case where the decorative film according to the embodiment of the present disclosure has two or more cholesteric liquid crystal layers, the two or more cholesteric liquid crystal layers may be in contact with each other to be laminated, or the two or more cholesteric liquid crystal layers may be laminated through other layers. In addition, a decoration product (for example, a decorative molded film) in which a decorative layer is formed by using the decorative film according to the embodiment of the present disclosure may be in a form in which two or more cholesteric liquid crystal layers are laminated on one side of the base material, or in a form in which two or more cholesteric liquid crystal layers are arranged on each of both sides of the base material. It is also possible to attach two or more base materials having a decorative layer formed by using the decorative film according to the embodiment of the present disclosure to form a decoration product having two or more cholesteric liquid crystal layers.

In the decorative film according to one embodiment of the present disclosure, it is preferable that a cholesteric liquid crystal layer in the region having a specular reflectivity forms a cholesteric alignment state in which the liquid crystal compound has a helical axis in a vertical direction of a surface of the decorative film.

The above-described vertical direction includes an approximately vertical direction. Approximately vertical means that, in a case where an angle between a direction along the surface of the decorative film and an axial direction of the helical axis is expressed in a range of 0° or more and 900 or less, the angle is 80° or more and 90° or less (preferably, 85° or more and 90° or less).

In the decorative film according to one embodiment of the present disclosure, it is preferable that, in a cholesteric liquid crystal layer in the region having a diffuse reflectivity, helical axes in a cholesteric alignment state are different from each other in a plane, and a cholesteric liquid crystal structure has a flapping structure in a cross-sectional view in a thickness direction.

By microscopic observation, it is known that the cross section of the cholesteric liquid crystal layer in a thickness direction has a structure of a stripe pattern consisting of a dark portion and a bright portion. In the present disclosure, the fact that the cholesteric liquid crystal structure has a flapping structure means that, in a case where the cholesteric liquid crystal layer is cross-sectionally viewed in the thickness direction, a flapping (uneven) stripe pattern consisting of a dark portion and a bright portion is observed.

The flapping structure can be formed, for example, by reducing restrictive force of an alignment layer or by forming unevenness on a base layer.

In a case where the cholesteric liquid crystal layer in the region having a diffuse reflectivity has the above-described flapping structure, scattering performance of light in the region having a diffuse reflectivity can be changed in various aspects. Since the decorative film according to the embodiment of the present disclosure has such a region having a specular reflectivity and region having a diffuse reflectivity, it is possible to exhibit more excellent designability.

In the decorative film according to one embodiment of the present disclosure, it is preferable that the cholesteric liquid crystal layer includes a plurality of regions having different pitches of helical structures.

The plurality of regions having different pitches of helical structures are preferably present in at least one region of the region having a specular reflectivity or the region having a diffuse reflectivity, and may be present in both regions. By including the plurality of regions having different pitches of helical structures, the decorative film according to the embodiment of the present disclosure can form a more complicated pattern shape.

The pitch of the helical structure in the region having a specular reflectivity and/or the region having a diffuse reflectivity can be adjusted by light irradiation, heating, or the like. For the pitch of the helical structure, for example, methods described in paragraphs [0009] to [0021] of WO2020/122245A can be referred to, and the methods of adjusting the pitch of the helical structure described in the document are incorporated herein by reference.

<Alignment Layer>

The decorative film according to one embodiment of the present disclosure may include an alignment layer (also referred to as an alignment film) in contact with the cholesteric liquid crystal layer. The alignment layer is used for aligning the molecules of the liquid crystal compound in a liquid crystal layer composition in a case of forming a layer (that is, a liquid crystal layer) including the liquid crystal compound.

For example, since the alignment layer is used in the case of forming the liquid crystal layer, in a decorative film which does not include the liquid crystal layer, the alignment layer may or may not be included.

For example, the alignment layer can be provided by a rubbing treatment of an organic compound (preferably a polymer), an oblique vapor deposition of an inorganic compound (for example, $SiO_2$), or a formation of a layer having a microgroove. Furthermore, an alignment layer in which an alignment function occurs by application of an electric field, application of a magnetic field, or light irradiation has also been known.

Depending on a material of a layer which is a underlayer of the cholesteric liquid crystal layer, the alignment layer may be provided, or the underlayer may be subjected to a direct alignment treatment (for example, rubbing treatment) to function as an alignment layer. Polyethylene terephthalate (PET) can be mentioned as an example of such a underlayer. In addition, in a case where a layer (also referred to as an upper layer) is directly laminated on the liquid crystal layer, in some cases, the liquid crystal layer as the underlayer behaves as the alignment layer and the liquid crystal compound for forming the upper layer can be aligned. In such a case, the liquid crystal compound in the upper layer can be aligned without providing the alignment layer or performing a special alignment treatment (for example, rubbing treatment).

Hereinafter, as a preferred example of the alignment layer, a rubbing-treated alignment layer which is used by subjecting a surface to a rubbing treatment, and a photoalignment layer will be described.

<<Rubbing-Treated Alignment Layer>>

The rubbing-treated alignment layer is an alignment layer to which aligning properties are imparted by a rubbing treatment.

Examples of a polymer which can be used in the rubbing-treated alignment layer include a methacrylate-based copolymer, a styrene-based copolymer, polyolefin, polyvinyl alcohol and modified polyvinyl alcohol, poly(N-methylol acrylamide), polyester, polyimide, a vinyl acetate copolymer, carboxymethyl cellulose, and polycarbonate, which are described in paragraph 0022 of JP1996-338913A (JP-H8-338913A). A silane coupling agent can be used as the polymer. As the polymer which can be used in the rubbing-treated alignment layer, a water-soluble polymer (for example, poly(N-methylol acrylamide), carboxymethyl cellulose, gelatin, polyvinyl alcohol, and modified polyvinyl alcohol) is preferable, gelatin, polyvinyl alcohol, or modified polyvinyl alcohol is more preferable, and polyvinyl alcohol or modified polyvinyl alcohol is particularly preferable.

In a method of aligning the liquid crystal compound using the rubbing-treated alignment layer, for example, the molecules of the liquid crystal compound are aligned by coating a rubbing-treated surface of the rubbing-treated alignment layer with the composition for forming the cholesteric liquid crystal layer. Thereafter, as necessary, by reacting the alignment layer polymer with a polyfunctional monomer included in the above-described cholesteric liquid crystal layer, or by crosslinking polymer included in the alignment layer using a crosslinking agent, the cholesteric liquid crystal layer can be formed.

A film thickness of the alignment layer is preferably in a range of 0.1 μm to 10 μm.

—Rubbing Treatment—

The surface of the alignment layer, the support, or other layers, to be coated with the above-described composition for forming the cholesteric liquid crystal layer, may be subjected to a rubbing treatment as necessary. The rubbing treatment can be generally performed by rubbing a surface of a film containing a polymer as a main component with paper or cloth in a certain direction. The general method of the rubbing treatment is described in, for example, "Handbook of Liquid crystals" (published by Maruzen, Oct. 30, 2000).

As a method of changing a rubbing density, the method described in "Handbook of Liquid crystals" (published by Maruzen) can be used. The rubbing density (L) is quantified by Expression (A).

$$L=Nl(1+2\pi rn/60v)$$ Expression (A)

In Expression (A), N is the number of times of rubbing, π is the pi, l is a contact length of a rubbing roller, r is a radius of the roller, n is a rotation speed (revolutions per minute: rpm; the same applies hereinafter) of the roller, and v is a stage moving speed (speed per second).

In order to increase the rubbing density, it is sufficient that the number of times of rubbing is increased, the contact length of the rubbing roller is increased, the radius of the roller is increased, the rotation speed of the roller is increased, or the stage moving speed is decreased. On the other hand, in order to decrease the rubbing density, it is sufficient that the reverse is carried out. In addition, with regard to conditions for the rubbing treatment, the description in JP4052558B can be referred to.

<<Photoalignment Layer>>

The photoalignment layer is an alignment layer to which aligning properties are imparted by light irradiation. A photoalignment material used for the photoalignment layer is described in many references. Preferred examples of the photoalignment material include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo alignment unit, described in JP2002-265541A and JP2002-317013A; photo-crosslinkable silane derivatives described in JP4205195B and JP4205198B; and photo-crosslinkable polyimides, polyamides, or esters described in JP2003-520878A, JP2004-529220A, and JP4162850B. Azo compounds or photo-crosslinkable polyimides, polyamides, or esters are particularly preferable.

For example, the photoalignment layer is manufactured by subjecting a layer formed of the above-described material to an irradiation of linearly polarized light or non-polarized light. In the present disclosure, the "irradiation of linearly polarized light" is an operation for causing a photo-reaction of the photoalignment material. The wavelength of the light used depends on the photoalignment material used, and is not particularly limited as long as a wavelength necessary for the photo-reaction. The peak wavelength of the light used for light irradiation is preferably 200 nm to 700 nm and the light is more preferably ultraviolet light having a peak wavelength of 400 nm or less.

Examples of a light source used for light irradiation include commonly used light sources, for example, lamps such as a tungsten lamp, a halogen lamp, a xenon lamp, a xenon flash lamp, a mercury lamp, a mercury-xenon lamp, and a carbon arc lamp, various lasers (such as semiconductor laser, helium neon laser, argon ion laser, helium cadmium laser, and YAG laser), light emitting diodes, cathode ray tube, and the like.

As a method for obtaining the linearly polarized light, a method of using a polarizing plate (for example, iodine polarizing plate, dichroic coloring agent polarizing plate, and wire grid polarizing plate), a method of using a prismatic element (for example, Glan-Thomson prism) or a reflective type polarizer using Brewster's angle, or a method of using light emitted from a polarized laser light source can be adopted. In addition, by using a filter, a wavelength conversion element, or the like, only light having a required wavelength may be irradiated selectively.

In a case where the irradiated light is the linearly polarized light, a method of irradiating, from the upper surface or the back surface, the alignment layer with the light perpendicularly or obliquely to the surface of the alignment layer is adopted. The incidence angle of the light varies depending on the photoalignment material, but is preferably 0° to 900 (perpendicular) and more preferably 40° to 90°.

In a case of using the non-polarized light, the non-polarized light is irradiated obliquely. The incidence angle of the light is preferably 10° to 80°, more preferably 20° to 60°, and particularly preferably 30° to 50°. The irradiation time is preferably 1 minute to 60 minutes and more preferably 1 minute to 10 minutes.

<Colored Layer>

The decorative film according to one embodiment of the present disclosure preferably includes a colored layer. In addition, in some embodiments, the decorative film is preferably a decorative film for viewing the colored layer through the cholesteric liquid crystal layer.

The color of the colored layer is not particularly limited, and it is sufficient that the colored layer is a colored (that is, not colorless and transparent) layer. The colored layer is preferably an opaque colored layer (preferably, a colored layer having a total light transmittance of 10% or less).

In addition, the color of the colored layer may be black, gray, white, red, orange, yellow, green, blue, or violet. A black-colored layer is preferable from the viewpoint that the intensity of the reflected light is low and the change in color is more emphasized.

In addition, the colored layer may be a layer formed by curing a polymerizable compound, or may be a layer including a polymerizable compound and a polymerization initiator. From the viewpoint of storability and adhesiveness between the colored layer and other layers, the colored layer is preferably a layer formed by curing a polymerizable compound and more preferably a layer formed by curing at least a bifunctional or trifunctional polymerizable compound which has at least one partial structure selected from the group consisting of a urethane bond and an alkyleneoxy group having 2 or 3 carbon atoms.

<<Colorant>>

The colored layer preferably includes a colorant from the viewpoint of visibility, and more preferably includes a pigment as a colorant from the viewpoint of durability. The colorant is not particularly limited, and a colorant having a target color tone can be appropriately selected and used. Examples of the colorant include a pigment and a dye, and a pigment is preferable. In addition, the pigment is preferably a pigment having a particle shape. As the pigment, various inorganic pigments or organic pigments known in the related art can be used.

Examples of the inorganic pigment include inorganic pigments described in paragraph 0015 and paragraph 0114 of JP2005-7765A.

Specific examples of the inorganic pigment include white pigments such as titanium dioxide, zinc oxide, lithopone, light calcium carbonate, white carbon, aluminum oxide, aluminum hydroxide, and barium sulfate, and black pigments such as carbon black, titanium black, titanium carbon, iron oxide, and graphite.

For example, known chromatic pigments such as iron oxide, barium yellow, cadmium red, and chrome yellow can also be used.

Examples of the organic pigment include organic pigments described in paragraph 0093 of JP2009-256572A.

Specific examples of the organic pigment include red pigments such as C. I. Pigment Red 177, 179, 224, 242, 254, 255, and 264, yellow pigments such as C. I. Pigment Yellow 138, 139, 150, 180, and 185, orange pigments such as C. I. Pigment Orange 36, 38, and 71, green pigments such as C. I. Pigment Green 7, 36, and 58, blue pigments such as C. I. Pigment Blue 15:6, and violet pigments such as C. I. Pigment Violet 23.

In addition, as the pigment, the colored layer may include particles of a pigment (so-called bright pigment) having a light-transmitting property and light-reflecting property. In a case where a method for forming the colored layer includes a step of exposing the colored layer, the bright pigment is preferably used in a range that does not hinder the curing by exposure.

The colorant may be used singly, or two or more kinds thereof may be used in combination. In addition, particles of the inorganic pigment and particles of the organic pigment may be used in combination. From the viewpoint of developing the target color tone (for example, suppressing whitening) and maintaining shape-following property of the colored layer to the mold, a content of the colorant in the colored layer is preferably 1% by mass to 50% by mass, more preferably 5% by mass to 50% by mass, and still more preferably 10% by mass to 40% by mass with respect to the total mass of the colored layer. Here, the "whitening" in the present disclosure means that the colored layer changes so as to exhibit a whitish tint with a matt tone.

<<Polymerizable Compound>>

The colored layer used in the present disclosure may include a polymerizable compound. The polymerizable compound is a compound having a polymerizable group.

Examples of a polymerizable group include an ethylenically unsaturated group and an epoxy group, and from the viewpoint of curability, an ethylenically unsaturated group is preferable and a (meth)acryloxy group is more preferable.

In addition, as the polymerizable group, a radically polymerizable group is preferable.

As the polymerizable compound, a bifunctional or trifunctional polymerizable compound (hereinafter, also referred to as a "specific polymerizable compound") having at least one partial structure selected from the group consisting of a urethane bond, a urea bond, an alkyleneoxy group having 2 or 3 carbon atoms, and a hydrocarbon group having 6 to 12 carbon atoms is preferable, and a compound including a urethane bond in the partial structure is more preferable.

—Bifunctional or Trifunctional Polymerizable Compound Having Urethane Bond—

As the bifunctional or trifunctional polymerizable compound (hereinafter, also referred to as a "specific polymerizable compound 1") having a urethane bond, a urethane oligomer is preferable. A nitrogen atom in the urethane bond may be two-substituted (one of the groups on the nitrogen atom is a hydrogen atom) or three-substituted. In addition, the specific polymerizable compound 1 preferably has a urethane resin chain.

As the urethane oligomer, urethane (meth)acrylate oligomer is preferable. Examples of the urethane (meth)acrylate oligomer include an aliphatic urethane (meth)acrylate and an aromatic urethane (meth)acrylate. For details, the reference can be made to Oligomer Handbook (edited by Junji Furukawa, The Chemical Daily Co., Ltd.), and the urethane oligomer described therein can be appropriately selected according to the purpose and used for forming the colored layer.

A molecular weight of the urethane oligomer which is one of the specific polymerizable compound 1 is preferably 800 to 2,000 and more preferably 1,000 to 2,000.

As the urethane (meth)acrylate oligomer which is one of the specific polymerizable compound 1, a commercially available product may be used.

Examples of the commercially available product of the urethane (meth)acrylate oligomer include U-2PPA and UA-122P manufactured by Shin-Nakamura Chemical Co., Ltd.; CN964A85, CN964, CN959, CN962, CN963J85, CN965, CN982B88, CN981, CN983, CN991, CN991NS, CN996, CN996NS, CN9002, CN9007, CN9178, and CN9893 manufactured by Sartomer Japan Inc.; and EBECRYL230, EBECRYL270, EBECRYL284, EBECRYL4858, EBECRYL210, EBECRYL8402, EBECRYL8804, and EBECRYL8800-20R manufactured by DAICEL-ALLNEX LTD. (above, product name). Note that, "EBECRYL" is a registered trademark.

<<Dispersant>>

From the viewpoint of improving dispersibility of the pigment included in the colored layer, the colored layer may contain a dispersant. In a case where the colored layer contains a dispersant, dispersibility of the pigment in the formed colored layer is improved, and the color tone of the decorative film to be obtained can be uniformized.

The dispersant can be appropriately selected and used according to the type and shape of the pigment, but is preferably a polymer dispersant. Examples of the polymer dispersant include silicone polymers, acrylic polymers, and polyester polymers.

In a case where it is desired to impart heat resistance to the decorative film, silicone polymers such as a graft type silicone polymer are suitably used as the dispersant.

A weight-average molecular weight of the dispersant is preferably 1,000 to 5,000,000, more preferably 2,000 to 3,000,000, and particularly preferably 2,500 to 3,000,000. In a case where the weight-average molecular weight is 1,000 or more, dispersibility of the pigment is further improved.

As the dispersant, a commercially available product may be used. Examples of the commercially available product include EFKA 4300 (acrylic polymer dispersant) manufactured by BASF Japan, HOMOGENOL L-18, HOMOGENOL L-95, and HOMOGENOL L-100 manufactured by Kao Corporation, Solsperse 20000 and Solsperse 24000 manufactured by Lubrizol Corporation, and DISPERBYK-110, DISPERBYK-164, DISPERBYK-180, and DISPERBYK-182 manufactured by BYK Chemie Japan. "HOMOGENOL", "Solsperse", and "DISPERBYK" are all registered trademarks.

In a case where the colored layer contains the dispersant, the colored layer may contain only one kind of dispersant or two or more kinds of dispersants.

The content of the dispersant is preferably 1 part by mass to 30 parts by mass with respect to 100 parts by mass of the colorant.

<<Polymerization Initiator>>

The colored layer may include a polymerization initiator. From the viewpoint of increasing sensitivity to exposure, the polymerization initiator is preferably a photopolymerization initiator. As the photopolymerization initiator, for example, polymerization initiators described in paragraphs 0031 to 0042 of JP2011-95716A and oxime-based polymerization initiators described in paragraphs 0064 to 0081 of JP2015-014783A can be used.

Specific examples of the photopolymerization initiator include 1-[4-(phenylthio)phenyl]-1,2-octanedione-2-(O-benzoyloxime) (for example, IRGACURE (registered trademark) OXE-01 manufactured by BASF), [9-ethyl-6-(2-methylbenzoyl)-9H-carbazol-3-yl]ethan-1-one-1-(0-acetyloxime) (for example, IRGACURE (registered trademark) OXE-02 manufactured by BASF), 2-(dimethylamino)-2-[(4-methylphenyl)methyl]-1-[4-(4-morpholinyl)phenyl]-1-butanone (for example, IRGACURE (registered trademark) 379EG manufactured by BASF), 2-methyl-1-(4-methylthiophenyl)-2-morpholinopropan-1-one (for example, IRGACURE (registered trademark) 907 manufactured by BASF), 2-hydroxy-1-{4-[4-(2-hydroxy-2-methyl-propionyl)benzyl]phenyl}-2-methyl-propan-1-one (for example, IRGACURE (registered trademark) 127 manufactured by BASF), 2-benzyl-2-dimethylamino-1-(4-morpholinophenyl)butanone-1 (for example, IRGACURE (registered trademark) 369 manufactured by BASF), 2-hydroxy-2-methyl-1-phenylpropan-1-one (for example, IRGACURE (registered trademark) 1173 manufactured by BASF), 1-hydroxycyclohexyl phenyl ketone (for example, IRGACURE (registered trademark) 184 manufactured by BASF), 2,2-dimethoxy-1,2-diphenylethan-1-one (for example, IRGACURE (registered trademark) 651 manufactured by BASF), product name: Lunar 6 which is an oxime ester-based polymerization initiator (manufactured by DKSH Japan), 2,4-diethylthioxanthone (for example, KAYACURE DETX-S manufactured by Nippon Kayaku Co., Ltd.), and DFI-091 and DFI-020 which are fluorene oxime-based polymerization initiator (both manufactured by DAITO CHEMIX Co., Ltd.).

Among these, from the viewpoint of increasing curing sensitivity, an initiator other than a halogen-containing polymerization initiator, such as a trichloromethyltriazine-based compound, is preferably used, and oxime-based polymerization initiators such as an α-aminoalkylphenone-based compound, an α-hydroxyalkylphenone-based compound, and an oxime ester-based compound are more preferable.

The content of the polymerization initiator is preferably 0.1 parts by mass to 15 parts by mass and more preferably 0.5 parts by mass to 10 parts by mass with respect to 100 parts by mass of the polymerizable compound.

<<Binder Resin>>

From the viewpoint of reducing curing shrinkage of the colored layer, the colored layer preferably contains a binder resin.

The binder resin is not particularly limited, and a known resin can be appropriately selected. From the viewpoint of obtaining a target color tone, as the binder resin, a transparent resin is preferable, and specifically, a resin having a total light transmittance of 80% or more is preferable.

The total light transmittance can be measured by a spectrophotometer (for example, spectrophotometer UV-2100 manufactured by Shimadzu Corporation).

Examples of the binder resin include acrylic resins, silicone resins, polyester resins, urethane resins, and olefin resins.

Among these, from the viewpoint of transparency, acrylic resins, silicone resins, or polyester resins are preferable, and acrylic resins or silicone resins are more preferable. Furthermore, from the viewpoint of heat resistance, silicone resins are preferable.

The "acrylic resin" in the present disclosure means a resin including a constitutional unit derived from an acrylic monomer having a (meth)acryloyl group. The (meth)acryloyl group is a concept including a methacryloyl group and an acryloyl group. The acrylic resin includes, for example, an acrylic acid homopolymer, a methacrylic acid homopolymer, an acrylic acid ester homopolymer, a methacrylic acid ester homopolymer, a copolymer of acrylic acid and other monomers, a copolymer of methacrylic acid and other monomers, a copolymer of acrylic acid ester and other monomers, a copolymer of methacrylic acid ester and other monomers, and a urethane-modified copolymer having a urethane skeleton in the side chain. Examples of the acrylic resin include a glycidyl methacrylate adduct of a cyclohexyl methacrylate/methyl methacrylate/methacrylic acid copolymer, a random copolymer of benzyl methacrylate/methacrylic acid, a copolymer of allyl methacrylate/methacrylic acid, and a copolymer of benzyl methacrylate/methacrylic acid/hydroxyethyl methacrylate.

As the silicone resin, a known silicone resin can be used, and examples thereof include methyl-based straight silicone resins, methylphenyl-based straight silicone resins, acrylic resin-modified silicone resins, ester resin-modified silicone resins, epoxy resin-modified silicone resins, and alkyd resin-modified silicone resins, and rubber-based silicone resins.

Among these, methyl-based straight silicone resins, methylphenyl-based straight silicone resins, acrylic resin-modified silicone resins, or rubber-based silicone resins are preferable, and methyl-based straight silicone resins, methylphenyl-based straight silicone resins, or rubber-based silicone resins are more preferable.

As the silicone resin, a commercially available product may be used, and examples of the commercially available product include KR-300, KR-311, KR-251, X-40-2406M, and KR-282 manufactured by Shin-Etsu Chemical Co., Ltd.

Examples of the polyester resin include a linear saturated polyester synthesized from aromatic dibasic acid or an ester-forming derivative thereof, and diol or an ester-forming derivative thereof. Specific examples of the linear saturated polyester include polyethylene terephthalate, polyethylene isophthalate, polybutylene terephthalate, poly(1,4-cyclohexylene dimethylene terephthalate), and polyethylene-2,6-naphthalate.

From the viewpoint of reducing curing shrinkage of the colored layer, the content of the binder resin is preferably 5% by mass to 70% by mass, more preferably 10% by mass to 60% by mass, and still more preferably 20% by mass to 60% by mass with respect to the total mass of the colored layer. In addition, the ratio of the total amount of the binder resin to the total amount of the polymerizable compound including the specific polymerizable compound, that is, the total amount of the polymerizable compound/the total amount of the binder resin is preferably 0.3 to 1.5 and more preferably 0.5 to 1.0.

<<Other Components>>

The colored layer may contain additives as necessary, in addition to the above-described components.

As the additive, a known additive can be used, and examples thereof include surfactants described in paragraph 0017 of JP4502784B and paragraphs 0060 to 0071 of JP2009-237362A, thermal polymerization inhibitor described in paragraph 0018 of JP4502784B (also referred to as a polymerization inhibitor; preferably, phenothiazine), and other additives described in paragraphs 0058 to 0071 of JP2000-310706.

<<Formation of Colored Layer>>

The method for forming the colored layer is not particularly limited, but it is preferable that the colored layer is formed using a composition for forming the colored layer. The composition for forming the colored layer preferably contains the colorant, and more preferably contains the colorant and an organic solvent. In addition, the composition for forming the colored layer may further contain the above-described other components. The composition for forming the colored layer can be prepared, for example, by mixing an organic solvent, and components contained in the colored layer, such as the colorant.

The content of the components contained in the colored layer is described as the content (% by mass) with respect to the total mass of the colored layer, but in a case where these components are contained in the composition for forming the colored layer, the content thereof may be considered as the content (% by mass) with respect to the total solid content of the composition for forming the colored layer.

In addition, in a case where the composition for forming the colored layer contains a pigment as the colorant, from the viewpoint of enhancing uniform dispersibility and dispersion stability of the pigment, it is preferable that a pigment dispersion liquid containing the pigment and a dispersant thereof is prepared in advance and the composition for forming the colored layer is prepared using the pigment dispersion liquid.

As the composition for forming the colored layer, a composition prepared in advance by the above-described method may be used, a commercially available product or the like may be used, or a composition for forming the colored layer may be prepared immediately before coating.

—Organic Solvent—

As the organic solvent, a generally used organic solvent can be used without particular limitation. Specific examples thereof include organic solvents such as esters, ethers, ketones, and aromatic hydrocarbons.

In addition, as the organic solvent in the composition for forming the colored layer, methyl ethyl ketone, propylene glycol monomethyl ether, propylene glycol monomethyl ether acetate, cyclohexanone, cyclohexanol, methyl isobutyl ketone, ethyl lactate, methyl lactate, and the like, which are the same as Solvent described in paragraphs 0054 and 0055 of US2005/282073A, can also be suitably used.

Among these, as the organic solvent in the composition for forming the colored layer, 1-methoxy-2-propyl acetate, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, diethylene glycol monoethyl ether acetate (ethyl carbitol acetate), diethylene glycol monobutyl ether acetate (butyl carbitol acetate), propylene glycol methyl ether acetate, methyl ethyl ketone, and the like are preferably used.

These organic solvents may be used singly, or two or more kinds thereof may be used in combination.

In addition, the content of the organic solvent is not particularly limited, but is preferably 5% by mass to 90% by mass and more preferably 30% by mass to 70% by mass with respect to the total mass of the composition for forming the colored layer (for example, a coating solution).

<Adhesive Layer>

From the viewpoint of adhesiveness to the housing to which the decorative film is attached, or adhesiveness between layers, the decorative film according to one embodiment of the present disclosure preferably includes an adhesive layer. A material of the adhesive layer is not particularly limited and can be appropriately selected depending on the purpose. Examples of the adhesive layer include a layer including a known pressure sensitive adhesive or adhesive.

<<Pressure Sensitive Adhesive>>

Examples of the pressure sensitive adhesive include an acrylic pressure sensitive adhesive, a rubber-based pressure sensitive adhesive, and a silicone-based pressure sensitive adhesive. In addition, examples of the pressure sensitive adhesive include acrylic pressure sensitive adhesives, ultraviolet (UV) curable pressure sensitive adhesives, and silicone-based pressure sensitive adhesives described in Chapters 2 of "Characterization evaluation of release paper, release film, and adhesive tape, and control technique thereof", 2004, Information Mechanism. The acrylic pressure sensitive adhesive refers to a pressure sensitive adhesive including a polymer ((meth)acrylic polymer) of a (meth)acrylic monomer. In a case where the adhesive layer contains a pressure sensitive adhesive, the adhesive layer may further contain a viscosity imparting agent.

<<Adhesive>>

Examples of the adhesive include a urethane resin adhesive, a polyester adhesive, an acrylic resin adhesive, an ethylene vinyl acetate resin adhesive, a polyvinyl alcohol adhesive, a polyamide adhesive, and a silicone adhesive. From the viewpoint of higher adhesive force, a urethane resin adhesive or a silicone adhesive is preferable.

In the decorative film according to some embodiments, it is preferable that a relationship between a thickness ($T2$) of the colored layer, a thickness s ($T3$) of the reflective layer (preferably, a thickness of the cholesteric liquid crystal layer), and a thickness ($T4$) of the adhesive layer satisfies $T4<10(T2+T3)$. By satisfying the above-described relationship, it is possible to obtain a decorative film which is a thin film and has excellent lustrousness and visibility in a case of being viewed through a transparent housing, for example. $T4<8(T2+T3)$ is more preferable, $T4<5(T2+T3)$ is still more preferable, and $T4<3(T2+T3)$ is particularly preferable.

<<Method for Forming Adhesive Layer>>

A method for forming the adhesive layer is not particularly limited, and examples thereof include a method of laminating a protective film on which the adhesive layer has been formed so that the adhesive layer and an object (for example, the reflective layer, the alignment layer, or the colored layer) are in contact with each other, a method of laminating the adhesive layer alone so as to be in contact with an object (for example, the reflective layer, the alignment layer, or the colored layer), and a method of applying a composition including the pressure sensitive adhesive or the adhesive to an object (for example, the reflective layer, the alignment layer, or the colored layer). As a laminating method, a known method can be used. Preferred examples of an applying method include the same method as the applying method of the liquid crystal composition.

From the viewpoint of both adhesive strength and handleability, a thickness of the adhesive layer in the decorative film is preferably 2 μm to 40 μm, more preferably 3 μm to 25 μm, still more preferably 4 μm to 20 μm, and particularly preferably 4 μm to 15 am.

<Other Layers>

The decorative film according to one embodiment of the present disclosure may include other layers in addition to the above-described layers. Examples of the other layers include a self-repairing layer, an antistatic layer, an antifouling layer, an anti-electromagnetic wave layer, and a conductive layer, which are known as a layer for a decorative film. The other layers in the decorative film according to one embodiment of the present disclosure can be formed by known methods. Examples thereof include a method of applying a composition (composition for forming a layer) containing components included in these layers in a layered shape, and drying the composition.

<<Cover Film>>

For the purpose of preventing stains, and the like, the decorative film according to one embodiment of the present disclosure may include a cover film as an outermost layer on the reflective layer side based on the base material. The cover film is not particularly limited as long as the cover film is formed of a material having flexibility and good peelability, and examples thereof include resin films. Examples of the resin film include a polyethylene film. The cover film is introduced into the decorative film, for example, by attaching the cover film to an object (for example, the reflective layer). The method for attaching the cover film is not particularly limited, and examples thereof include a known attaching method, such as a method of laminating the cover film on the object (for example, the reflective layer).

<Layer Configuration of Decorative Film>

Here, an example of layer configuration of the decorative film will be described with reference to FIG. 1. However, the layer configuration of the decorative film is not limited to the layer configuration shown in the figure.

FIG. 1 is a schematic cross-sectional view showing an example of layer configuration of the decorative film according to the embodiment of the present disclosure. A decorative film 20 shown in FIG. 1 includes, on a base material 24, an alignment layer 26, a cholesteric liquid crystal layer 28 which is a reflective layer on the alignment layer 26, and a colored layer 30 on the cholesteric liquid crystal layer 28, and includes an adhesive layer 22 on the base material 24 on a side opposite to the side having the cholesteric liquid crystal layer 28.

(Decorative Molded Film)

In the present disclosure, a decorative molded film means a film which includes the decorative film according to one embodiment of the present disclosure and is used for decorative molding. A certain aspect of the decorative molded film include a form in which the decorative film according to one embodiment of the present disclosure is attached to a base material for molding. The decorative molded film has a plurality of regions having different reflection performances in a plane, at least one of the plurality of regions is a region having a specular reflectivity, and at least another one of the plurality of regions is a region having a diffuse reflectivity. Therefore, a decorative molded product using the decorative molded film has different reflection patterns in a plane, and a pattern shape having excellent designability is formed by these different reflection patterns.

The base material in the decorative molded film according to the embodiment of the present disclosure is preferably a film base material. In addition, the base material in the decorative molded film according to the embodiment of the present disclosure is preferably a base material for molding. The base material is the same as the above-described base material, and the preferred aspect thereof is also the same.

In addition, as a method for manufacturing the decorative molded film according to the embodiment of the present disclosure, a method of attaching a base material in a decoration method according to an embodiment of the present disclosure described later can be referred to.

(Decoration Method and Decoration Product)

The decoration method according to the present disclosure is not particularly limited as long as a decoration method using the decorative film according to one embodiment of the present disclosure. The decoration method preferably includes a step of attaching the decorative film to an object to be decorated. One of suitable aspects of the object to be decorated is a transparent housing.

In a certain aspect of the decoration method, it is preferable to include a step of attaching the decorative film to the transparent housing from a side of the base material, opposite to a side having the reflective layer, for example. The decorative film can be attached to the transparent housing through the adhesive layer. The decoration product according to the present disclosure is a decoration product using the decorative film according to the embodiment of the present disclosure, and is preferably a decoration product obtained by the decoration method according to the embodiment of the present disclosure.

(Molded Product and Manufacturing Method of Molded Product)

Using the decorative film according to one embodiment of the present disclosure (or the decorative molded film), a molded product according to one embodiment of the present disclosure can be manufactured by performing decoration and molding. That is, the molded product according to one embodiment of the present disclosure is a molded product (that is, a decorative molded article) obtained by molding the decorative film according to the embodiment of the present disclosure (or the decorative molded film).

The manufacturing of the molded product (that is, the decorative molded article) may be any method as long as it is a method for manufacturing the decorative molded article, and for example, the method can be performed by attaching the decorative film to the transparent housing from a side of the base material, opposite to a side having the reflective layer.

Since the decorative film according to one embodiment of the present disclosure has excellent three-dimensional moldability, the decorative film according to one embodiment of the present disclosure can be suitably used for manufacturing a decorative molded article, and for example, it is particularly suitable for manufacturing a decorative molded article by at least one molding selected from the group consisting of three-dimensional molding and insert molding.

In addition, a decorative molded article may be manufactured by attaching the decorative film according to one embodiment of the present disclosure to a molded article after molding.

In a case of using the decorative film according to one embodiment of the present disclosure in a case of producing a decorative molded article, it can be applied to molds having more a complicated shape, smaller shape, and the like, which expands the range of applications of the decorative molded article.

In addition, suitable examples of the above-described molding include three-dimensional molding.

Suitable examples of the three-dimensional molding include heat molding, vacuum molding, pressure molding, and vacuum pressure molding.

The method of performing the vacuum molding is not particularly limited, but is preferably a method of performing three-dimensional molding in a heated state under vacuum.

The vacuum means a state in which an inside of a chamber is evacuated to a vacuum degree of 100 Pa or less.

It is sufficient that the temperature in a case of performing the three-dimensional molding is appropriately set depending on the used base material for molding, but the temperature is preferably in a temperature range of 60° C. or higher, more preferably in a temperature range of 80° C. or higher, and still more preferably in a temperature range of 100° C. or higher. The upper limit of the temperature in a case of performing the three-dimensional molding is preferably 200° C.

The temperature in a case of performing the three-dimensional molding means a temperature of the base material for molding supplied for the three-dimensional molding, and is measured by attaching a thermocouple to the surface of the base material for molding.

The above-described vacuum molding can be performed using a vacuum molding technique widely known in the molding field, and for example, the vacuum molding may be performed using Formech 508FS manufactured by NIHON SEIZUKI KOGYO CO., LTD.

The application of the molded product (decorative molded article) obtained as described above is not particularly limited. The decorative molded article can be used for various articles. Particularly suitable examples of the application of the decorative molded article include interior and exterior of electronic devices (for example, wearable devices and smartphones), interior and exterior of automobiles, interior and exterior of electronic products, and packaging containers.

EXAMPLES

Hereinafter, the present disclosure will be more specifically described with reference to Examples. The scope of the present disclosure is not limited to the specific examples shown below. In addition, "part" is on a mass basis unless otherwise specified.

Example 1

<Preparation of Support>

As a support (base material), COSMOSHINE A4300 (PET film, thickness: 38 μm, manufactured by Toyobo Co., Ltd., A4 size) was prepared.

<Formation of Alignment Layer 1>

A base layer coating solution 1 was applied to the base material with a wire bar coater.

Thereafter, the base material was dried at 100° C. for 120 seconds to produce a base material having an alignment layer 1 having a layer thickness of 0.5 μm.

[Composition of Coating Solution for Forming Alignment Layer 1]

Modified polyvinyl alcohol shown below: 28 parts by mass
Citric acid ester (AS3, manufactured by SANKYO CHEMICAL Co., Ltd.): 1.2 parts by mass
Photopolymerization initiator (IRGACURE 2959, manufactured by BASF): 0.84 parts by mass
Glutaraldehyde: 2.8 parts by mass
Water: 699 parts by mass
Methanol: 226 parts by mass
Modified polyvinyl alcohol (the following compounds; the numbers at the lower right of each constitutional unit represent the molar ratio)

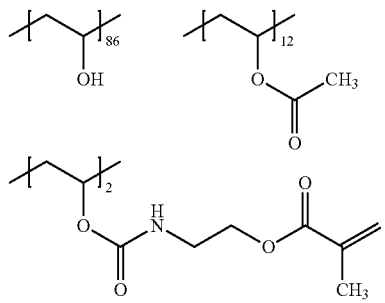

<Rubbing Treatment>

The alignment layer 1 produced above was subjected to a rubbing treatment (rayon cloth, pressure: 0.1 kgf (0.98 N), rotation speed: 1,000 rpm, transportation speed: 10 μm/min, number of times: 1 round trip) in a direction rotated counterclockwise by 31.5° with respect to a short side direction.

<Production of Mask (A) for Patterning>

Figure 2:
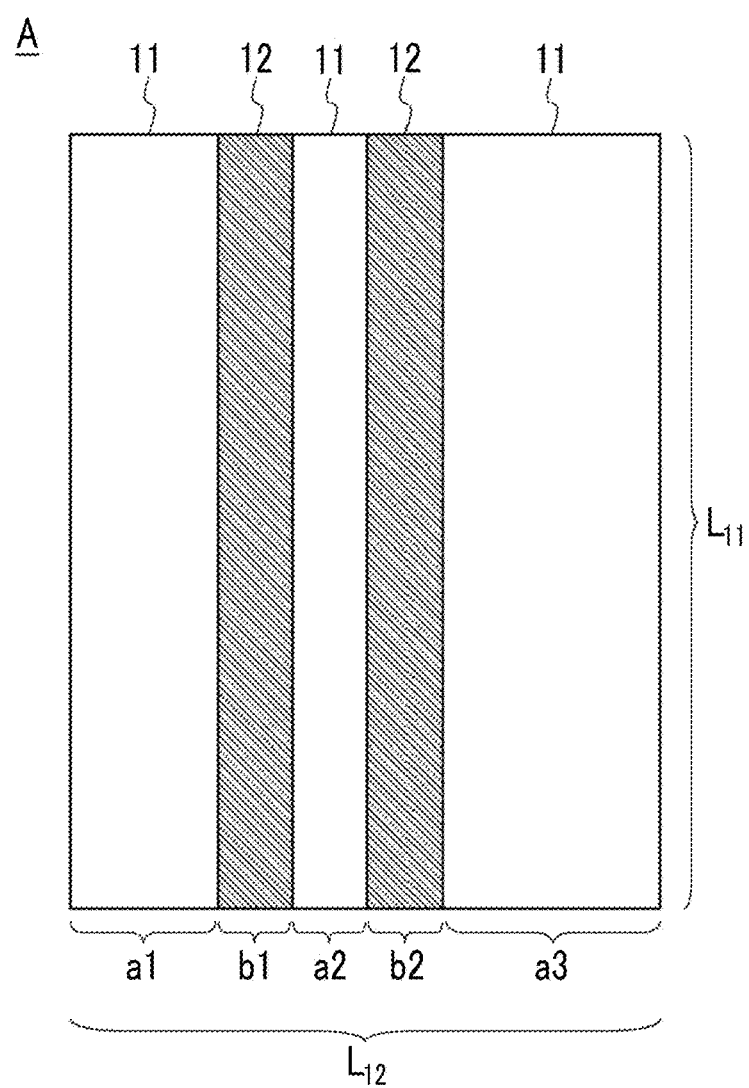
FIG. 2 is a schematic plan view showing a mask pattern A used in Examples.

A mask (A) for patterning was produced by cutting a central portion of a mask base material (COSMOSHINE A4300, thickness: 100 μm, manufactured by Toyobo Co., Ltd., A4 size) into a shape of a pattern (mask pattern A) shown in FIG. 2 using a cutting plotter.

In the mask pattern A shown in FIG. 2, 11 indicates a transmitting portion (void portion) and 12 indicates a shielding portion. Each of a1, a2, and a3 indicates a dimension of the transmitting portion 11 on a short side, and a1=20 mm, a2=10 mm, and a3=30 mm. Each of b1 and b2 indicates a dimension of the shielding portion 12 on a short side, and b1=10 mm and b2=10 mm. Each of $L_{11}$ and $L_{12}$ indicates a dimension of the mask pattern A on a long side and a short side, and $L_{11}$=80 mm and $L_{12}$=152 mm.

<Patterning>

The mask (A) for patterning obtained above was superposed on the rubbing-treated alignment layer 1, and using Panasonic Steamer nanocare compact type pink EH-SA39-P, steam was evenly exposed to the alignment layer 1 through the mask (A) for patterning. The temperature of the steam reached the alignment layer 1 was 100° C., and the exposure time of the steam was 5 seconds.

<Formation of Cholesteric Liquid Crystal Layer 1>

Components in the composition shown below were stirred and dissolved in a container kept at 25° C. to prepare a coating solution 1 (liquid crystal composition 1) for a cholesteric liquid crystal layer.

[Composition of Coating Solution 1 for Cholesteric Liquid Crystal Layer]

Methyl ethyl ketone: 150.6 parts
Liquid crystal compound 1 (rod-like liquid crystal compound): 92 parts
Photopolymerization initiator A (IRGACURE 907, manufactured by BASF): 0.50 parts
Chiral agent A: 4.00 parts
Chiral agent B: 4.00 parts
Surfactant F1 described below: 0.027 parts
Liquid crystal compound 1 (monofunctional): rod-like liquid crystal compound shown below; in a case of a radical polymerization type, the liquid crystal compound 1 is defined as monofunctional because, although the liquid crystal compound 1 has an oxetanyl group (a cationically polymerizable functional group), the liquid crystal compound 1 has only one acryloxy group (radically polymerizable group); the same applies to the cationic polymerization type.

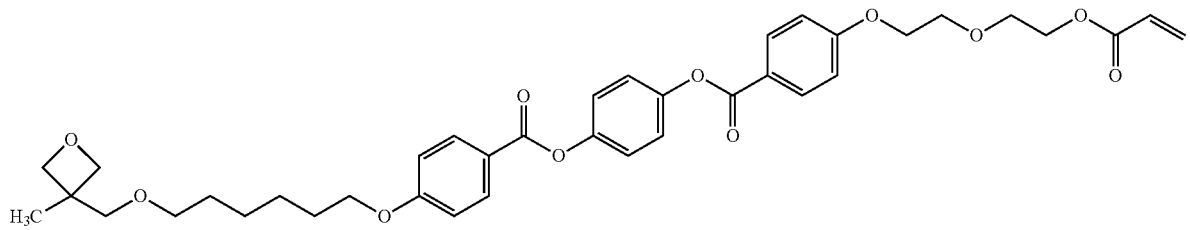 [SMILES: C=CC(=O)OCCOCCOc1ccc(C(=O)Oc2ccc(OC(=O)c3ccc(OCCCCCCOCC4(C)COC4)cc3)cc2)cc1]

Chiral agent A (bifunctional): compound shown below

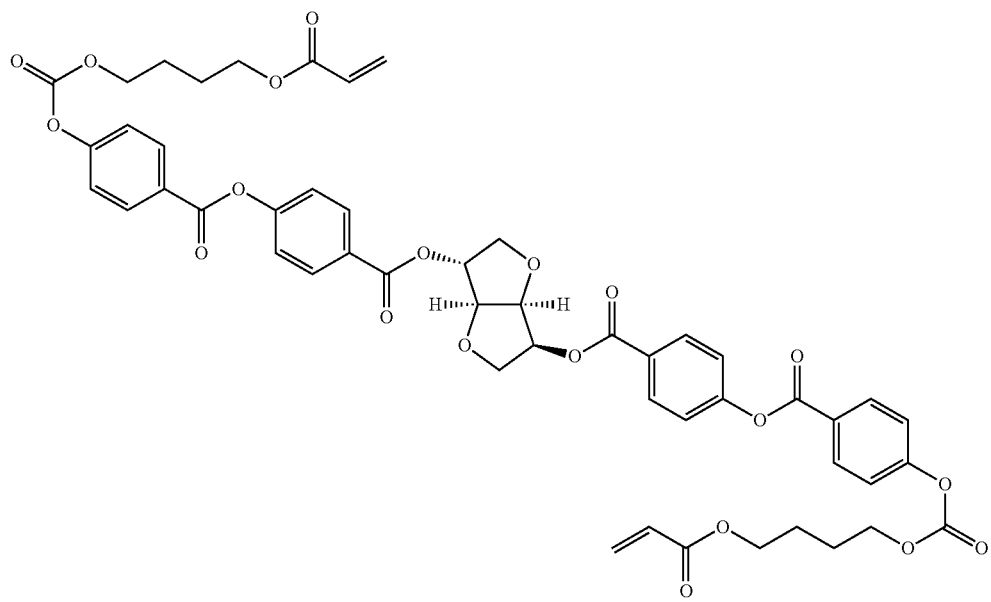 [SMILES: C=CC(=O)OCCCCOC(=O)Oc1ccc(C(=O)Oc2ccc(C(=O)O[C@H]3CO[C@@H]4[C@H]3OC[C@H]4OC(=O)c3ccc(OC(=O)c4ccc(OC(=O)OCCCCOC(=O)C=C)cc4)cc3)cc2)cc1]

Chiral agent B (non-functional): compound shown below; in the following compound, Bu represents an n-butyl group.

Surfactant F1: compound shown below

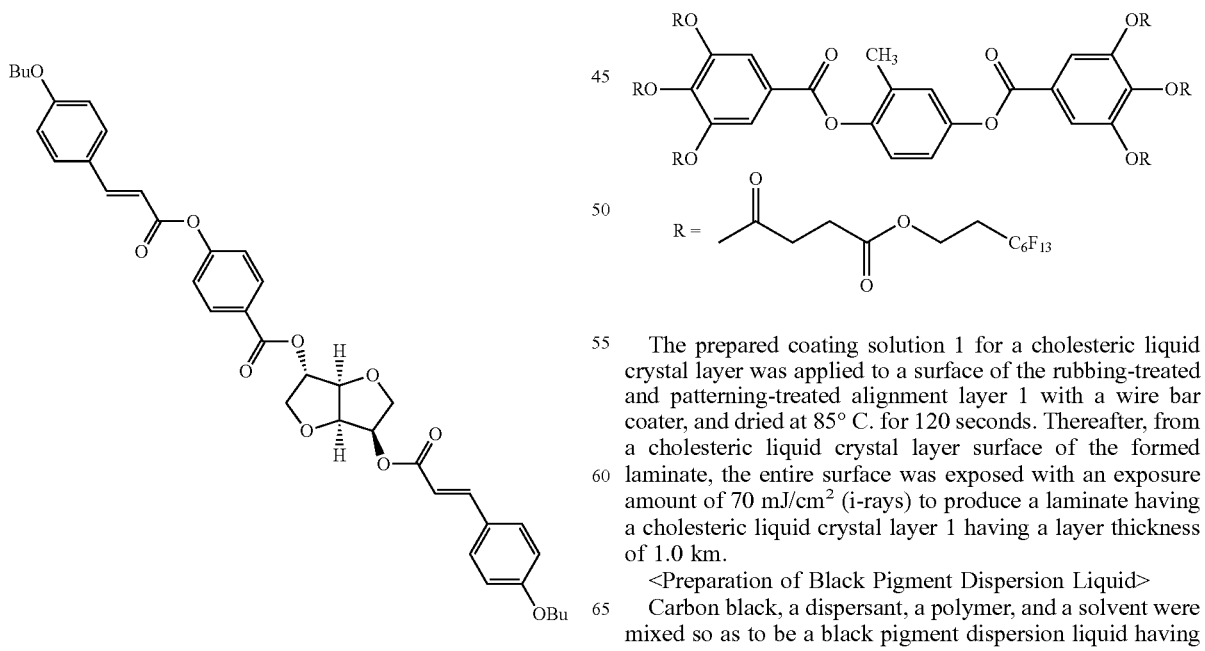

The prepared coating solution 1 for a cholesteric liquid crystal layer was applied to a surface of the rubbing-treated and patterning-treated alignment layer 1 with a wire bar coater, and dried at 85° C. for 120 seconds. Thereafter, from a cholesteric liquid crystal layer surface of the formed laminate, the entire surface was exposed with an exposure amount of 70 mJ/cm$^2$ (i-rays) to produce a laminate having a cholesteric liquid crystal layer 1 having a layer thickness of 1.0 km.

<Preparation of Black Pigment Dispersion Liquid>

Carbon black, a dispersant, a polymer, and a solvent were mixed so as to be a black pigment dispersion liquid having a composition of the below, and a black pigment dispersion liquid was obtained by using a three-roll mill and a beads mill. An average particle diameter measured using Microtrac FRA (Honeywell Japan Ltd.) was 163 nm.

—Composition of Black Pigment Dispersion Liquid—

Resin-coated carbon black produced according to the description of paragraphs 0036 to 0042 of JP5320652B: 20.0% by mass Dispersant 1 (the following structure): 1.0% by mass Polymer (benzyl methacrylate/methacrylic acid random copolymer product having a molar ratio of 72/28; weight-average molecular weight: 30,000): 6.0% by mass Propylene glycol monomethyl ether acetate: 73.0% by mass Dispersant 1

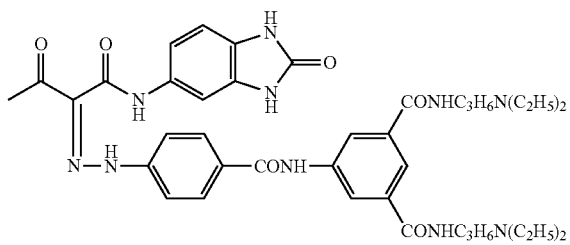

[Composition of Coating Solution for Forming Colored Layer 1]

| | |
|---|---|
| Black pigment dispersion liquid: | 30 parts by mass |
| Polymerizable compound 1: urethane acrylate oligomer, manufactured by Sartomer Japan Inc., CN-996NS | 25 parts by mass |
| Binder resin 3: ethyl acetate/ethyl methyl ketone/ isopropyl alcohol solution containing 35% by mass of a urethane-modified acrylic polymer (containing polyol) | 25 parts by mass |
| Photopolymerization initiator (IRGACURE 2959, manufactured by BASF): | 1.0 part by mass |
| Methyl ethyl ketone: | 19 parts by mass |

<Formation of Colored Layer 1>

The coating solution for forming a colored layer 1 was applied to the cholesteric liquid crystal layer 1 with a wire bar coater and dried at 100° C. for 10 minutes. Thereafter, from a colored layer surface of the formed laminate, the entire surface was exposed with an exposure amount of 500 mJ/cm$^2$ (i-rays) to form a colored layer 1 (black colored layer) having a layer thickness of 4 μm.

<Formation of Adhesive Layer 1>

An acrylic pressure sensitive adhesive liquid (SK-Dyne SG-50Y, manufactured by Soken Chemical & Engineering Co., Ltd.) was applied, with a comma coater, to a base material surface opposite to the surface on which the colored layer 1 had been formed, and dried at 120° C. for 2 minutes, thereby forming an adhesive layer 1 having a layer thickness of 25 μm.

As a result, a laminate 1 (decorative film 1 for molding) was produced.

In the laminate 1, a region corresponding to the transmitting portion 11 of the mask pattern A was the region having a diffuse reflectivity, and a region corresponding to the shielding portion 12 was the region having a specular reflectivity.

<Confirmation Regarding Cholesteric Liquid Crystal Layer>

A cross section of the obtained laminate was observed by SEM (JSM-7800F, manufactured by JEOL Ltd., magnification: 10,000 times). As a result, it was confirmed that the liquid crystal layer in the region having a specular reflectivity formed a cholesteric alignment state in which a helical axis was in a vertical direction of the surface of the decorative film, and in the liquid crystal layer in the region having a diffuse reflectivity, helical axes in a cholesteric alignment state were different from each other in a plane, and a cholesteric liquid crystal structure was a flapping structure with an average period of 2 μm in a cross-sectional view in a thickness direction.

<Molding>

Figure 4A:
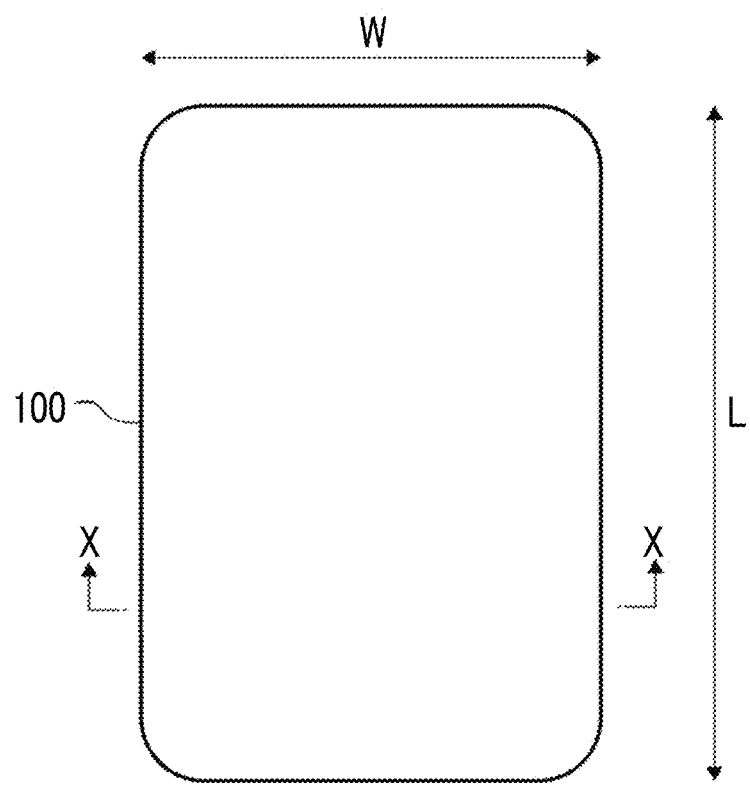
FIG. 4A is a schematic top view showing a transparent housing used in Examples.
Figure 4B:
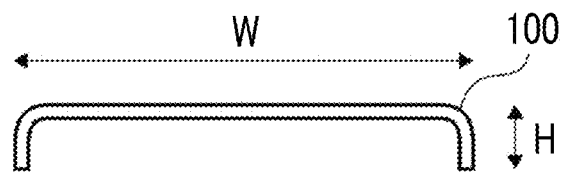
FIG. 4B is a cross-sectional view taken along a line X-X of FIG. 4A.

The laminate 1 was subjected to a compressed air molding (TOM molding) using a transparent housing 100 (thickness H: 2 mm, width W: 80 mm, length L: 152 mm) having a top surface shape shown in FIG. 4A and a cross-sectional shape shown in FIG. 4B (X-X cross section of FIG. 4A), so that the surface of the adhesive layer 1 in the laminate 1 was in contact with a concave surface of the transparent housing 100, thereby obtaining a decorative molded article (molded product) 1. A TOM molding machine NGF-0510-R (manufactured by Fu-se Vacuum Forming) was used for the compressed air molding, and the molding temperature was set to 120° C. and the stretching ratio was set to 30% at the highest portion.

The decorative molded article 1 had the region having a specular reflectivity and the region having a diffuse reflectivity in a portion derived from the laminate 1.

With regard to the obtained decorative molded article 1, in a case where an integral reflectance (Ri) of the region having a specular reflectivity and the region having a diffuse reflectivity at each reflected light peak wavelength was measured using a spectrophotometer "V-670" manufactured by JASCO Corporation, all results were 45%.

In addition, in the region having a specular reflectivity, a ratio (Rm/Ri) of a 5° specular reflectance (Rm) to the integral reflectance (Ri) at the reflected light peak wavelength was 91%.

In the region having a diffuse reflectivity, a ratio (Rm/Ri) of a 5° specular reflectance (Rm) to the integral reflectance (Ri) at the reflected light peak wavelength was 23%.

The above-described measurement was performed from the transparent housing side.

Since the decorative molded article 1 had a different reflection pattern in the in-plane direction of the portion provided with the laminate 1, it was possible to obtain a unique designability in which a design (that is, a pattern shape) was formed with the same reflectance.

Example 2

Figure 3:
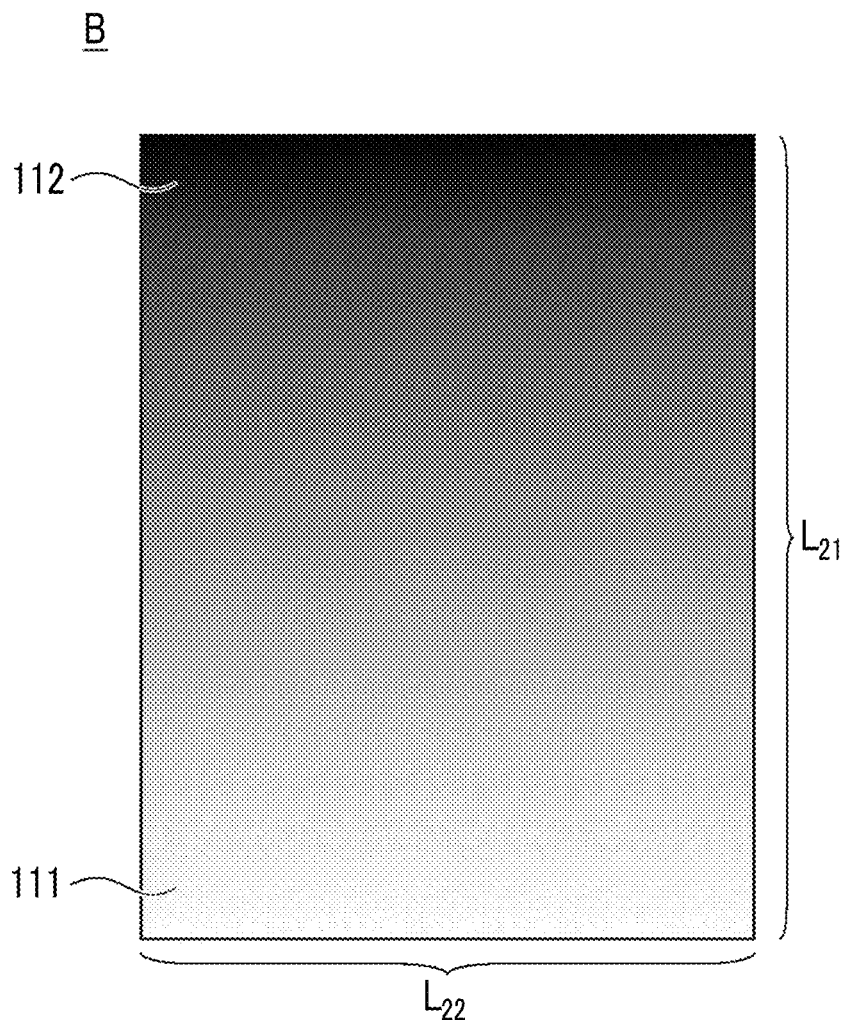
FIG. 3 is a schematic plan view showing a mask pattern B used in Examples.

A decorative molded article (molded product) 2 was produced in the same manner as in Example 1, except that, in Example 1, a mask (B) for patterning produced by changing the mask pattern A shown in FIG. 2 to a mask pattern B shown in FIG. 3 was used.

<Production of Mask (B) for Patterning>

The mask (B) for patterning was produced by cutting a mask base material with a cutting plotter. In the mask pattern B shown in FIG. 3, 111 indicates a transmitting portion (void portion) and 112 indicates a shielding portion. The transmitting portion 111 was formed by halftone dots communicating with the mask base material. A boundary between the transmitting portion 111 and the shielding portion 112 was not separated, and a gradation was formed from the transmitting portion 111 to the shielding portion 112 so that a halftone dot density increases. Each of $L_{21}$ and $L_{22}$ indicates a dimension of the mask pattern B on a long side and a short side, and $L_{21}$=80 mm and $L_{22}$=152 mm.

With regard to the obtained decorative molded article 1, in a case where an integral reflectance (Ri) of the region having a specular reflectivity and the region having a diffuse reflectivity at each reflected light peak wavelength was measured using a spectrophotometer "V-670" manufactured by JASCO Corporation, all results were 45%.

In addition, in the region having a specular reflectivity, a ratio (Rm/Ri) of a 5° specular reflectance (Rm) to the integral reflectance (Ri) at the reflected light peak wavelength was 91%.

In the region having a diffuse reflectivity, a ratio (Rm/Ri) of a 5° specular reflectance (Rm) to the integral reflectance (Ri) at the reflected light peak wavelength was 23%.

Example 3

In Example 1, the coating solution 1 for a cholesteric liquid crystal layer was applied to a base material with a wire bar coater, and dried at 85° C. for 120 seconds. A decorative molded article (molded product) 3 was produced in the same manner as in Example 1, except that, after superimposing a mask (C) for patterning shown in FIG. 5 on the liquid crystal layer, the entire surface was exposed from a mask side with an exposure amount of 15 mJ/cm² (i-rays) to form a cholesteric pitch into a gradation pattern.

Figure 5:
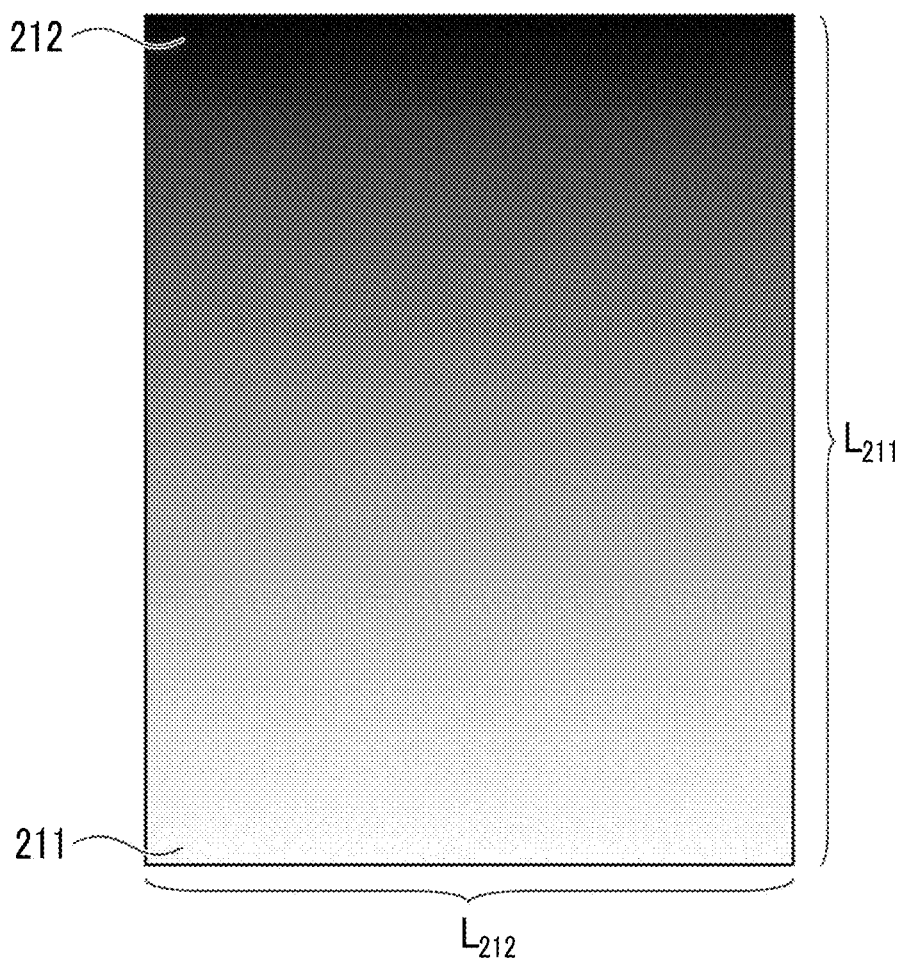
FIG. 5 is a schematic plan view showing a mask (C) for patterning used in Examples.

In a mask (C) for patterning in FIG. 5, which is the mask 200 for patterning, a boundary between a transmitting portion 211 and a shielding portion (that is, a light shielding portion) 212 was not separated, and a gradation was formed from the transmitting portion 211 to the shielding portion (black portion) 212 so that a black color density increases. Each of $L_{211}$ and $L_{212}$ indicates a dimension of the mask 200 for patterning on a long side and a short side.

With regard to the obtained decorative molded article 3, same as Example 1, in a case where an integral reflectance (Ri) of the region having a specular reflectivity and the region having a diffuse reflectivity at each reflected light peak wavelength was measured using a spectrophotometer "V-670" manufactured by JASCO Corporation, all results were 45%.

In addition, in the region having a specular reflectivity, a ratio (Rm/Ri) of a 5° specular reflectance (Rm) to the integral reflectance (Ri) at the reflected light peak wavelength was 91%.

In the region having a diffuse reflectivity, a ratio (Rm/Ri) of a 5° specular reflectance (Rm) to the integral reflectance (Ri) at the reflected light peak wavelength was 23%. In addition, it was confirmed that the decorative molded article 3 exhibited a gradation pattern of blue to red in the reflected color.

Example 4

A decorative molded article (molded product) 4 was produced in the same manner as in Example 1, except that, in Example 1, the coating solution for forming the alignment layer 1 was changed to a coating solution for forming an alignment layer 2 (that is, a coating solution for forming a photoalignment layer) to form an alignment layer 2, and the step of evenly exposing steam to the alignment layer through the mask (A) for patterning using Panasonic Steamer nanocare compact type pink EH-SA39-P was changed to a step of exposing the entire surface through the mask (C) for patterning shown in FIG. 5 with an exposure amount of 15 mJ/cm² (i-rays).

[Composition of Coating Solution for Forming Alignment Layer 2]

Compound described in paragraph [0022] [Chemical Formula 3] of JP4151746B: 3.9 parts Surfactant F1: 0.1 parts Solvent (methyl ethyl ketone): 96.0 parts With regard to the obtained decorative molded article 4, in a case where an integral reflectance (Ri) of the region having a specular reflectivity and the region having a diffuse reflectivity at each reflected light peak wavelength was measured using a spectrophotometer "V-670" manufactured by JASCO Corporation, all results were 44%.

In addition, in the region having a specular reflectivity, a ratio (Rm/Ri) of a 5° specular reflectance (Rm) to the integral reflectance (Ri) at the reflected light peak wavelength was 88%.

In the region having a diffuse reflectivity, a ratio (Rm/Ri) of a 5° specular reflectance (Rm) to the integral reflectance (Ri) at the reflected light peak wavelength was 28%. The above-described measurement was performed from the transparent housing side.

EXPLANATION OF REFERENCES

20: decorative film
22: adhesive layer
24: base material
26: alignment layer
28: cholesteric liquid crystal layer
30: colored layer
A: mask pattern A
B: mask pattern B
200: mask for patterning
11, 111, 211: transmitting portion
12, 112, 212: shielding portion
$L_{11}$, $L_{12}$: dimension of mask pattern
$L_{211}$, $L_{212}$: dimension of mask for patterning
211: transparent portion
212: black portion
a1, a2, a3: dimension of transmitting portion in short side direction
b1, b2: dimension of shielding portion in short side direction
100: transparent housing
H: thickness of transparent housing
W: width of transparent housing
L: length of transparent housing The disclosure of JP2019-205281 filed Nov. 13, 2019 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A decorative film comprising, in the following order:
an adhesive layer;
a base material; and
a reflective layer which consists of a dielectric multi-layer film and develops a color due to an optical interference or a structural color, wherein:
the dielectric multi-layer film has a plurality of regions having different reflection performances in an in-plane direction,
at least one of the plurality of regions is a region having a specular reflectivity,
at least another one of the plurality of regions is a region having a diffuse reflectivity,
wherein, in the region having a specular reflectivity, a ratio of a 5° specular reflectance to an integral reflectance at a reflected light peak wavelength is 70% or more, and
in the region having a diffuse reflectivity, a ratio of a 5° specular reflectance to an integral reflectance at a reflected light peak wavelength is 8% or more and less than 30%.

2. The decorative film of claim 1, further comprising a colored layer.

3. The decorative film according to claim 1,
wherein the reflective layer is a cholesteric liquid crystal layer obtained by immobilizing a liquid crystal compound.

4. The decorative film according to claim 3,
wherein the cholesteric liquid crystal layer in the region having a specular reflectivity forms a cholesteric alignment state in which the liquid crystal compound has a helical axis in a vertical direction of a surface of the decorative film.

5. The decorative film according to claim 3,
wherein, in the cholesteric liquid crystal layer in the region having a diffuse reflectivity, helical axes in a cholesteric alignment state are different from each other in a plane, and a cholesteric liquid crystal structure has a flapping structure in a cross-sectional view in a thickness direction.

6. The decorative film according to claim 4,
wherein the cholesteric liquid crystal layer includes a plurality of regions having different pitches of helical structures.

7. A molded product obtained by molding the decorative film according to claim 1.

8. An electronic device comprising:
the molded product according to claim 7.

* * * * *